(12) United States Patent
Chen et al.

(10) Patent No.: US 10,187,260 B1
(45) Date of Patent: Jan. 22, 2019

(54) SYSTEMS AND METHODS FOR MULTILAYER MONITORING OF NETWORK FUNCTION VIRTUALIZATION ARCHITECTURES

(71) Applicant: Dell Software Inc., Aliso Viejo, CA (US)

(72) Inventors: Yuling Chen, Fremont, CA (US); Yinghua Qin, Zhuhai (CN)

(73) Assignee: Quest Software Inc., Aliso Viejo, CA (US)

( * ) Notice: Subject to any disclaimer, the term of this patent is extended or adjusted under 35 U.S.C. 154(b) by 488 days.

(21) Appl. No.: 14/725,778

(22) Filed: May 29, 2015

(51) Int. Cl.
| G06F 15/16 | (2006.01) |
| H04L 12/24 | (2006.01) |
| H04L 12/26 | (2006.01) |
| G06F 9/455 | (2018.01) |

(52) U.S. Cl.
CPC .......... *H04L 41/12* (2013.01); *G06F 9/45558* (2013.01); *H04L 41/145* (2013.01); *H04L 43/04* (2013.01); *G06F 2009/45595* (2013.01)

(58) Field of Classification Search
CPC ....... H04L 41/12; H04L 41/145; H04L 43/04; G06F 9/45558; G06F 2009/45595
See application file for complete search history.

(56) References Cited

U.S. PATENT DOCUMENTS

| 3,701,971 A | 10/1972 | Sanner et al. |
| 3,839,707 A | 10/1974 | Woodward et al. |
| 4,468,728 A | 8/1984 | Wang |
| 4,683,532 A | 7/1987 | Yount et al. |
| 4,937,740 A | 6/1990 | Agarwal et al. |
| 5,103,394 A | 4/1992 | Blasciak |
| 5,321,838 A | 6/1994 | Hensley et al. |
| 5,375,199 A | 12/1994 | Harrow et al. |
| 5,432,932 A | 7/1995 | Chen et al. |
| 5,450,586 A | 9/1995 | Kuzara et al. |

(Continued)

FOREIGN PATENT DOCUMENTS

WO WO-2013162596 A1 10/2013

OTHER PUBLICATIONS

U.S. Appl. No. 15/201,655, Qin et al.

(Continued)

*Primary Examiner* — Normin Abedin
(74) *Attorney, Agent, or Firm* — Winstead PC

(57) ABSTRACT

In one embodiment, a method is performed by a computer system. The method includes creating an integrated topology model (ITM) instance of interconnected topology objects. The ITM instance includes a physical infrastructure topology model (PITM) instance comprising first interconnected topology objects, a virtual infrastructure topology model (VITM) instance comprising second interconnected topology objects, a network service topology model (NSTM) instance comprising third interconnected topology objects and inter-model linking information. The method also includes generating dependencies between the interconnected topology objects of the ITM instance based, at least in part, on the inter-model linking information. Further, the method includes generating a dependency graph based, at least in part, on the dependencies. The method also includes outputting at least a portion of the dependency graph for presentation to a user.

20 Claims, 16 Drawing Sheets

(56) References Cited

U.S. PATENT DOCUMENTS

| | | |
|---|---|---|
| 5,493,658 A | 2/1996 | Chiang et al. |
| 5,506,955 A | 4/1996 | Chen et al. |
| 5,517,629 A | 5/1996 | Boland |
| 5,528,753 A | 6/1996 | Fortin |
| 5,539,907 A | 7/1996 | Srivastava et al. |
| 5,572,640 A | 11/1996 | Schettler |
| 5,600,789 A | 2/1997 | Parker et al. |
| 5,623,598 A | 4/1997 | Voigt et al. |
| 5,649,187 A | 7/1997 | Hornbuckle |
| 5,671,351 A | 9/1997 | Wild et al. |
| 5,673,386 A | 9/1997 | Batra |
| 5,684,945 A | 11/1997 | Chen et al. |
| 5,701,137 A | 12/1997 | Kiernan et al. |
| 5,708,775 A | 1/1998 | Nakamura |
| 5,715,388 A | 2/1998 | Tsuchihashi |
| 5,715,415 A | 2/1998 | Dazey et al. |
| 5,720,018 A | 2/1998 | Muller et al. |
| 5,740,357 A | 4/1998 | Gardiner et al. |
| 5,748,881 A | 5/1998 | Lewis et al. |
| 5,752,062 A | 5/1998 | Gover et al. |
| 5,768,501 A | 6/1998 | Lewis |
| 5,872,909 A | 2/1999 | Wilner et al. |
| 5,881,306 A | 3/1999 | Levine et al. |
| 5,903,453 A | 5/1999 | Stoddard, II |
| 5,903,898 A | 5/1999 | Cohen et al. |
| 5,911,048 A | 6/1999 | Graf |
| 5,960,425 A | 9/1999 | Buneman et al. |
| 5,978,594 A | 11/1999 | Bonnell et al. |
| 5,983,366 A | 11/1999 | King |
| 5,999,734 A | 12/1999 | Willis et al. |
| 6,018,567 A | 1/2000 | Dulman |
| 6,029,170 A | 2/2000 | Garger et al. |
| 6,035,412 A | 3/2000 | Tamer et al. |
| 6,128,016 A | 10/2000 | Coelho et al. |
| 6,148,335 A | 11/2000 | Haggard et al. |
| 6,173,322 B1 | 1/2001 | Hu |
| 6,195,092 B1 | 2/2001 | Dhond et al. |
| 6,199,199 B1 | 3/2001 | Johnston et al. |
| 6,223,171 B1 | 4/2001 | Chaudhuri et al. |
| 6,243,105 B1 | 6/2001 | Hoyer et al. |
| 6,330,008 B1 | 12/2001 | Razdow et al. |
| 6,351,754 B1 | 2/2002 | Bridge, Jr. et al. |
| 6,381,628 B1 | 4/2002 | Hunt |
| 6,473,791 B1 | 10/2002 | Al-Ghosein et al. |
| 6,538,669 B1 | 3/2003 | Lagueux, Jr. et al. |
| 6,543,006 B1 | 4/2003 | Zundel et al. |
| 6,594,655 B2 | 7/2003 | Tal et al. |
| 6,622,221 B1 | 9/2003 | Zahavi |
| RE38,270 E | 10/2003 | Nakajima |
| 6,633,640 B1 | 10/2003 | Cohen et al. |
| 6,654,830 B1 | 11/2003 | Taylor et al. |
| 6,751,555 B2 | 6/2004 | Poedjono |
| 6,771,646 B1 | 8/2004 | Sarkissian et al. |
| 6,833,787 B1 | 12/2004 | Levi |
| 6,847,970 B2 | 1/2005 | Keller et al. |
| 6,901,582 B1 | 5/2005 | Harrison |
| 6,993,454 B1 | 1/2006 | Murstein et al. |
| 7,010,588 B2 | 3/2006 | Martin et al. |
| 7,103,843 B2 | 9/2006 | Hand et al. |
| 7,127,324 B2 | 10/2006 | Batori et al. |
| 7,257,635 B2 | 8/2007 | Chellis et al. |
| 7,274,375 B1 | 9/2007 | David |
| 7,363,211 B1 | 4/2008 | Naganathan et al. |
| 7,370,105 B2 | 5/2008 | Lebourg et al. |
| 7,389,345 B1 | 6/2008 | Adams |
| 7,436,822 B2 | 10/2008 | Lee et al. |
| 7,480,647 B1 | 1/2009 | Murstein et al. |
| 7,480,866 B2 | 1/2009 | Germain et al. |
| 7,483,978 B2 | 1/2009 | Esfahany et al. |
| 7,512,888 B2 | 3/2009 | Sugino et al. |
| 7,523,128 B1 | 4/2009 | Miller et al. |
| 7,532,642 B1 | 5/2009 | Peacock |
| 7,557,803 B2 | 7/2009 | Furukawa et al. |
| 7,558,790 B1 | 7/2009 | Miller et al. |
| 7,565,610 B2 | 7/2009 | Li et al. |
| 7,587,492 B2 | 9/2009 | Dyck et al. |
| 7,620,984 B2 | 11/2009 | Kallahalla et al. |
| 7,644,397 B2 | 1/2010 | Warren et al. |
| 7,685,251 B2 | 3/2010 | Houlihan et al. |
| 7,698,683 B1 | 4/2010 | Miller et al. |
| 7,784,027 B2 | 8/2010 | Harrison |
| 7,792,941 B2 | 9/2010 | Fried et al. |
| 7,822,837 B1 | 10/2010 | Urban et al. |
| 7,882,216 B2 | 2/2011 | Houlihan et al. |
| 7,917,617 B1 | 3/2011 | Ponnapur et al. |
| 7,950,026 B1 | 5/2011 | Urbach |
| 7,962,590 B1 | 6/2011 | Or et al. |
| 7,979,245 B1 | 7/2011 | Bourlatchkov et al. |
| 8,051,162 B2 | 11/2011 | Arlitt et al. |
| 8,051,330 B2 | 11/2011 | Cinato et al. |
| 8,051,382 B1 | 11/2011 | Kingdom et al. |
| 8,103,638 B2 | 1/2012 | Voznika et al. |
| 8,103,826 B2 | 1/2012 | Kobayashi |
| 8,112,366 B2 | 2/2012 | Hollingsworth et al. |
| 8,155,996 B1 | 4/2012 | Cassone et al. |
| 8,161,058 B2 | 4/2012 | Agarwal et al. |
| 8,175,862 B1 | 5/2012 | Bourlatchkov et al. |
| 8,175,863 B1 | 5/2012 | Ostermeyer et al. |
| 8,181,154 B2 | 5/2012 | Harrison |
| 8,185,598 B1 | 5/2012 | Golovin et al. |
| 8,203,972 B2 | 6/2012 | Sauermann |
| 8,217,945 B1 | 7/2012 | Moscovici |
| 8,239,526 B2 | 8/2012 | Simpson et al. |
| 8,255,516 B1 | 8/2012 | Zhang et al. |
| 8,307,337 B2 | 11/2012 | Chamieh et al. |
| 8,347,273 B2 | 1/2013 | Nageshappa et al. |
| 8,364,460 B2 | 1/2013 | Ostermeyer et al. |
| 8,423,646 B2 | 4/2013 | Jamjoom et al. |
| 8,438,609 B2 | 5/2013 | Cohen et al. |
| 8,490,055 B2 | 7/2013 | Basak |
| 8,555,244 B2 | 10/2013 | Harrison |
| 8,635,498 B2 | 1/2014 | Kahana et al. |
| 8,712,950 B2 | 4/2014 | Smith et al. |
| RE44,964 E | 6/2014 | Kymal et al. |
| 8,819,673 B1 | 8/2014 | Wilkinson et al. |
| 8,880,678 B1 | 11/2014 | Colton et al. |
| 8,892,415 B2 | 11/2014 | Bourlatchkov et al. |
| 8,902,248 B1 | 12/2014 | Bidarkar et al. |
| 8,930,395 B2 | 1/2015 | Sharma et al. |
| 8,966,036 B1 | 2/2015 | Asgekar et al. |
| 8,966,039 B1 | 2/2015 | Fultz et al. |
| 9,075,911 B2 | 7/2015 | Mohan et al. |
| 9,274,758 B1 | 3/2016 | Qin et al. |
| 9,288,147 B2 | 3/2016 | Kern et al. |
| 9,497,243 B1 | 11/2016 | Binns et al. |
| 9,557,879 B1 | 1/2017 | Wang et al. |
| 9,569,179 B1 * | 2/2017 | Kachmar |
| 9,811,365 B2 | 11/2017 | Borthakur |
| 9,860,139 B2 | 1/2018 | Spracklen et al. |
| 9,882,969 B2 | 1/2018 | Reddy et al. |
| 9,998,393 B2 | 6/2018 | Hanis et al. |
| 10,075,459 B1 | 9/2018 | Suryanarayanan et al. |
| 2001/0018710 A1 | 8/2001 | Clarke et al. |
| 2002/0138659 A1 | 9/2002 | Trabaris et al. |
| 2002/0175941 A1 | 11/2002 | Hand et al. |
| 2003/0009551 A1 | 1/2003 | Benfield et al. |
| 2003/0028630 A1 | 2/2003 | Bischof et al. |
| 2003/0084155 A1 | 5/2003 | Graupner et al. |
| 2003/0097438 A1 | 5/2003 | Bearden et al. |
| 2003/0101262 A1 | 5/2003 | Godwin |
| 2003/0126256 A1 | 7/2003 | Cruickshank et al. |
| 2003/0149753 A1 | 8/2003 | Lamb |
| 2003/0204588 A1 | 10/2003 | Peebles et al. |
| 2003/0225563 A1 | 12/2003 | Gonos |
| 2004/0006763 A1 | 1/2004 | Van De Vanter et al. |
| 2004/0012637 A1 | 1/2004 | Alford et al. |
| 2004/0030592 A1 | 2/2004 | Buck et al. |
| 2004/0039728 A1 | 2/2004 | Fenlon et al. |
| 2004/0046785 A1 | 3/2004 | Keller |
| 2004/0059812 A1 | 3/2004 | Assa |
| 2004/0064293 A1 | 4/2004 | Hamilton et al. |
| 2004/0068560 A1 | 4/2004 | Oulu et al. |
| 2004/0102925 A1 | 5/2004 | Giffords |
| 2004/0147265 A1 | 7/2004 | Kelley et al. |

(56) References Cited

U.S. PATENT DOCUMENTS

| | | |
|---|---|---|
| 2005/0021743 A1 | 1/2005 | Fleig et al. |
| 2005/0021748 A1 | 1/2005 | Garcea et al. |
| 2005/0044528 A1* | 2/2005 | Olsen .................. G06F 8/75 717/109 |
| 2005/0060300 A1 | 3/2005 | Stolte et al. |
| 2005/0111352 A1 | 5/2005 | Ho et al. |
| 2005/0187750 A1 | 8/2005 | Satoh et al. |
| 2005/0198649 A1 | 9/2005 | Zakonov |
| 2005/0232227 A1 | 10/2005 | Jorgenson et al. |
| 2006/0002478 A1 | 1/2006 | Seo |
| 2006/0101340 A1 | 5/2006 | Sridhar et al. |
| 2006/0168199 A1 | 7/2006 | Chagoly et al. |
| 2006/0171334 A1 | 8/2006 | Hirata et al. |
| 2006/0173875 A1 | 8/2006 | Stefaniak |
| 2006/0235928 A1 | 10/2006 | Cacenco et al. |
| 2007/0008884 A1 | 1/2007 | Tang |
| 2007/0028239 A1 | 2/2007 | Dyck et al. |
| 2007/0043860 A1 | 2/2007 | Pabari |
| 2007/0087756 A1 | 4/2007 | Hoffberg |
| 2007/0226341 A1 | 9/2007 | Mateo |
| 2007/0250525 A1 | 10/2007 | Sanghvi et al. |
| 2007/0255805 A1 | 11/2007 | Beams et al. |
| 2007/0255814 A1 | 11/2007 | Green et al. |
| 2008/0016115 A1 | 1/2008 | Bahl et al. |
| 2008/0077366 A1 | 3/2008 | Neuse et al. |
| 2008/0155537 A1 | 6/2008 | Dinda et al. |
| 2008/0162107 A1 | 7/2008 | Aniszczyk et al. |
| 2008/0162387 A1 | 7/2008 | Singh et al. |
| 2008/0208888 A1 | 8/2008 | Mitchell |
| 2008/0222633 A1 | 9/2008 | Kami |
| 2008/0263073 A1 | 10/2008 | Ohba et al. |
| 2008/0306711 A1 | 12/2008 | Bansal |
| 2008/0320269 A1 | 12/2008 | Houlihan et al. |
| 2009/0013281 A1 | 1/2009 | Helfman et al. |
| 2009/0083276 A1 | 3/2009 | Barsness et al. |
| 2009/0119301 A1 | 5/2009 | Cherkasova et al. |
| 2009/0147011 A1 | 6/2009 | Buck et al. |
| 2009/0150538 A1 | 6/2009 | Tripathi et al. |
| 2009/0164250 A1 | 6/2009 | Hamilton et al. |
| 2009/0172666 A1 | 7/2009 | Yahalom et al. |
| 2009/0177567 A1 | 7/2009 | McKerlich et al. |
| 2009/0199177 A1 | 8/2009 | Edwards et al. |
| 2009/0204718 A1 | 8/2009 | Lawton et al. |
| 2009/0210527 A1 | 8/2009 | Kawato |
| 2009/0222558 A1 | 9/2009 | Xu et al. |
| 2009/0241108 A1 | 9/2009 | Edwards et al. |
| 2009/0271646 A1 | 10/2009 | Talwar et al. |
| 2009/0300605 A1 | 12/2009 | Edwards et al. |
| 2010/0015926 A1 | 1/2010 | Luff |
| 2010/0114554 A1 | 5/2010 | Misra |
| 2010/0125665 A1 | 5/2010 | Simpson et al. |
| 2010/0138744 A1 | 6/2010 | Kamay et al. |
| 2010/0153862 A1 | 6/2010 | Schreiber |
| 2010/0153916 A1 | 6/2010 | Bhatkhande et al. |
| 2010/0190509 A1 | 7/2010 | Davis |
| 2010/0223609 A1 | 9/2010 | DeHaan et al. |
| 2010/0229096 A1 | 9/2010 | Maiocco et al. |
| 2010/0241690 A1 | 9/2010 | Kurapati et al. |
| 2010/0305721 A1 | 12/2010 | Kostadinov et al. |
| 2010/0315958 A1 | 12/2010 | Luo et al. |
| 2010/0317420 A1 | 12/2010 | Hoffberg |
| 2010/0325273 A1 | 12/2010 | Kudo |
| 2011/0047496 A1 | 2/2011 | Harrison |
| 2011/0066780 A1 | 3/2011 | Bruce et al. |
| 2011/0119748 A1 | 5/2011 | Edwards et al. |
| 2011/0125800 A1 | 5/2011 | Seager et al. |
| 2011/0145380 A1 | 6/2011 | Glikson et al. |
| 2011/0153724 A1 | 6/2011 | Raja et al. |
| 2011/0161851 A1 | 6/2011 | Barber et al. |
| 2011/0187711 A1 | 8/2011 | Giovinazzi et al. |
| 2011/0197205 A1 | 8/2011 | Wagner et al. |
| 2011/0208827 A1 | 8/2011 | Pitkow et al. |
| 2011/0209146 A1 | 8/2011 | Box et al. |
| 2011/0254704 A1 | 10/2011 | Fournier et al. |
| 2011/0270566 A1 | 11/2011 | Sawada et al. |
| 2011/0298804 A1 | 12/2011 | Hao et al. |
| 2011/0302577 A1 | 12/2011 | Reuther et al. |
| 2012/0005148 A1 | 1/2012 | Horvitz et al. |
| 2012/0011254 A1 | 1/2012 | Jamjoom et al. |
| 2012/0023429 A1 | 1/2012 | Medhi |
| 2012/0029929 A1 | 2/2012 | Schaude et al. |
| 2012/0030346 A1 | 2/2012 | Fukuda et al. |
| 2012/0079497 A1 | 3/2012 | Gangemi et al. |
| 2012/0137367 A1 | 5/2012 | Dupont et al. |
| 2012/0166623 A1 | 6/2012 | Suit |
| 2012/0198073 A1 | 8/2012 | Srikanth et al. |
| 2012/0221314 A1 | 8/2012 | Bourlatchkov et al. |
| 2012/0222002 A1 | 8/2012 | Harrison |
| 2012/0254395 A1 | 10/2012 | Bonas |
| 2012/0254900 A1 | 10/2012 | Kumar et al. |
| 2012/0271821 A1 | 10/2012 | Qin et al. |
| 2012/0271937 A1 | 10/2012 | Cotten et al. |
| 2012/0284713 A1 | 11/2012 | Ostermeyer et al. |
| 2013/0066823 A1 | 3/2013 | Sweeney et al. |
| 2013/0080641 A1 | 3/2013 | Lui et al. |
| 2013/0097580 A1 | 4/2013 | Meijer et al. |
| 2013/0159115 A1 | 6/2013 | Adams |
| 2013/0159999 A1 | 6/2013 | Chiueh et al. |
| 2013/0174127 A1 | 7/2013 | Chen et al. |
| 2013/0185433 A1 | 7/2013 | Zhu et al. |
| 2013/0211905 A1 | 8/2013 | Qin et al. |
| 2013/0212285 A1 | 8/2013 | Hoffmann et al. |
| 2013/0218547 A1 | 8/2013 | Ostermeyer et al. |
| 2013/0253718 A1 | 9/2013 | Meagher et al. |
| 2013/0262915 A1 | 10/2013 | Frank et al. |
| 2013/0331963 A1 | 12/2013 | Ahangar et al. |
| 2014/0006580 A1 | 1/2014 | Raghu |
| 2014/0013315 A1 | 1/2014 | Genevski et al. |
| 2014/0052712 A1 | 2/2014 | Savage et al. |
| 2014/0079297 A1 | 3/2014 | Tadayon et al. |
| 2014/0082612 A1 | 3/2014 | Breitgand et al. |
| 2014/0089901 A1 | 3/2014 | Hadar |
| 2014/0092722 A1 | 4/2014 | Jain et al. |
| 2014/0108647 A1 | 4/2014 | Bleess et al. |
| 2014/0115164 A1 | 4/2014 | Kalyanaraman et al. |
| 2014/0165054 A1 | 6/2014 | Wang et al. |
| 2014/0165063 A1 | 6/2014 | Shiva et al. |
| 2014/0229934 A1 | 8/2014 | Larkin et al. |
| 2014/0258872 A1 | 9/2014 | Spracklen et al. |
| 2014/0269691 A1 | 9/2014 | Xue et al. |
| 2014/0279838 A1 | 9/2014 | Tsirogiannis et al. |
| 2014/0304407 A1 | 10/2014 | Moon |
| 2014/0310813 A1 | 10/2014 | Murthy |
| 2014/0317261 A1 | 10/2014 | Shatzkamer et al. |
| 2014/0317293 A1 | 10/2014 | Shatzkamer |
| 2014/0337500 A1 | 11/2014 | Lee |
| 2014/0350888 A1 | 11/2014 | Gesmann |
| 2014/0372230 A1 | 12/2014 | Ray et al. |
| 2015/0032436 A1 | 1/2015 | van de Kamp |
| 2015/0032437 A1 | 1/2015 | Kumar et al. |
| 2015/0046212 A1 | 2/2015 | Mos |
| 2015/0052250 A1 | 2/2015 | Doganata et al. |
| 2015/0089483 A1* | 3/2015 | Guthridge .................. G06F 8/433 717/140 |
| 2015/0127415 A1 | 5/2015 | Showalter et al. |
| 2015/0127815 A1 | 5/2015 | Billore et al. |
| 2015/0134589 A1 | 5/2015 | Marrelli et al. |
| 2015/0142457 A1 | 5/2015 | Marshall |
| 2015/0199207 A1 | 7/2015 | Lin et al. |
| 2015/0358391 A1 | 12/2015 | Moon et al. |
| 2016/0011894 A1 | 1/2016 | Reddy et al. |
| 2016/0035114 A1 | 2/2016 | Hesse et al. |
| 2016/0042296 A1 | 2/2016 | Shan et al. |
| 2016/0048408 A1 | 2/2016 | Madhu et al. |
| 2016/0094401 A1 | 3/2016 | Anwar et al. |
| 2016/0147522 A1 | 5/2016 | Dimitrakos et al. |
| 2016/0191345 A1 | 6/2016 | Despotovic et al. |
| 2016/0254965 A1 | 9/2016 | Maes |
| 2016/0274948 A1 | 9/2016 | Kelly et al. |

(56) References Cited

U.S. PATENT DOCUMENTS

2016/0291942 A1 10/2016 Hutchison
2016/0359872 A1 12/2016 Yadav et al.

OTHER PUBLICATIONS

U.S. Appl. No. 15/201,657, Qin et al.
Wood, Timothy, et al.; Middleware 2008; "Profiling and Modeling Resource Usage of Virtualized Applications"; vol. 5346 of the series Lecture Notes in Computer Science; Dec. 2008; pp. 366-387.
Liquidware Labs; "Performance Validation and Optimization"; http://www.liquidwarelabs.com/products/stratusphere-ux/performance-validation-optimization; Oct. 1, 2015; 2 pages.
Dell, Inc.; "Monitoring with User Dashboards"; vWorkspace Monitoring and Diagnostics 5.5.5—User's Guide; http://documents.software.dell.com/vworkspace-monitoring-and-diagnostics/5.6.5/users-guide/users-guide/working-with-foglight-for-virtual-desktops/monitoring-with-user-dashboards?ParentProduct=687; last revised on May 23, 2013; 4 pages.
Agrawal, Banit, et al.; "VMware View® Planner: Measuring True Virtual Desktop Experience at Scale"; VMWare Technical Journal (VMTJ), Winter 2012; Dec. 2012; pp. 69-79.
Spracklen, Lawrence, et al.; "Comprehensive User Experience Monitoring"; VMWare Technical Journal (VMTJ), Spring 2012; Mar. 2012; pp. 22-31.
U.S. Appl. No. 13/745,677, Ostermeyer.
U.S. Appl. No. 13/658,709, Wang et al.
U.S. Appl. No. 13/658,724, Wang et al.
U.S. Appl. No. 14/607,776, Qin et al.
U.S. Appl. No. 14/607,907, Qin et al.
Wikimedia Foundation, Inc.; "Network Functions Virtualization"; http://en.wikipedia.org/wiki/Network_Functions_Virtualization; last modified Mar. 17, 2015; 6 pages.
NEO4J; "Network Dependency Graph"; http://www.neo4j.org/graphgist?github-neo4J . . . ; Jun. 18, 2014; 9 pages.
Template Software, Workflow Template Process Template, "Developing a WFT Workflow System", 1997, whole manual.
Partridge C. et al. Fire State Message Protocol Specification, BBN Technologies, Jul. 12, 2000, (pp. 1-19).
Newrelicblog, "Platform as a Service Meets SaaS Application Performance Management"; http://blog.newrelic.com/2011/01/13/platform-as-a-service-meets-saas-application-performance-management/; Jan. 13, 2011; 3 pages.
Quest Software, Inc.; "Instance Monitor"; Brochure, Quest Software, Inc.; 1999; 2 pages.
Boucher, Karen et al.; "Essential Guide to Object Monitors"; Mar. 1999; 263 pages (whole book).
Dewan, Prasun et al.; "A High-Level and Flexible Framework for Implementing Multiuser User Interfaces"; 1992; pp. 345-380.
Distributed Management Task Force, Inc. (DMTF); "Common Information Model (CIM) Infrastructure Specification"; Version 2.3 Final; Oct. 4, 2005; 102 pages.
Harrison, Guy; "Oracle SQL High-Performance Tuning"; ("Building a High-Performance Oracle Database Server" and "Tuning the Database Server"); Prentice-Hall, NJ; 1997; pp. 363-364 and 399-400.
Hitachi, LTD et al.; "Hitachi TPBroker User's Guide: Release 3.1"; Sep. 28, 1998; 311 pages (entire manual).
Laessig, Dirk; "Score Big with JSR 77, the J2EE Management Specification"; Javaworld; Jun. 14, 2002; 8 pages.
Muller, Nathan J.; "Focus on HP OpenView: A Guide to Hewlett-Packard's Network and Systems Management Platform"; CBM Books; 1995; 304 pages (entire book).
Savant Corporation; "Products"; http://www.savant-corp.com/prods.html, downloaded on Nov. 16, 1999; 1 page.
Savant Corporation; "Products"; http://www.savant-corp.com/prods.html, downloaded on Feb. 15, 2000; 1 page.
Savant Corporation; "Q Application Diagnostics"; http://www.savant-corp.com/qappd.html, downloaded on Nov. 16, 1999; 1 page.
Savant Corporation; "Q Hot SQL"; http://www.savant-corp.com/qhsql.html, downloaded on Nov. 16, 1999; 1 page.
Savant Corporation; "Q Instance Overview"; http://www.savant-corp.com/qiov.html, downloaded on Nov. 16, 1999; 1 page.
Savant Corporation; "Q Job Queue Manager"; http://www.savant-corp.com/qjobq.html, downloaded on Nov. 16, 1999; 1 page.
Savant Corporation; "Q Lock Manager"; http://www.savant-corp.com/qlock.html, downloaded on Nov. 16, 1999; 1 page.
Savant Corporation; "Q Replay Viewer"; http://www.savant-corp.com/qreplay.html, downloaded on Nov. 16, 1999; 1 page.
Singh, Inderjeet et al.; "Designing Web Services with J2EE 1.4 Platform JAX-RPC, SOAP, and XML Technologies"; Chapter 6 (pp. 247-289); May 2004; 46 pages.
Tang, Steven H. et al.; "Blending Structured Graphics and Layout"; ACM; Nov. 1994; pp. 167-174.
BMC Software, Inc.; "BMC Atrium Discovery and Dependency Mapping"; http://documents.bmc.com/products/documents/18/60/451860/451860.pdf ; 2014; 2 pages.
Grisby, Duncan; "The Power behind BMC Atrium Discovery and Dependency Mapping"; http://documents.bmc.com/products/documents/18/97/451897/451897.pdf; 2014; 5 pages.
Hewlett-Packard Development Company, L.P.; "Data Sheet: HP Universal Discovery Software"; http://h20195.www2.hp.com/V2/GetPDF.aspx/4AA4-1812ENW.pdf; Sep. 2014; 8 pages.
Quest Software, Inc.; "Foglight 5.6.4: Managing Dependency Mapping User Guide"; 2012; 62 pages.
Quest Software, Inc.; "Foglight 5.6.2: Managing the Dependency Mapping User Guide"; 2011; 55 pages.
Quest Software, Inc.; "Foglight APM: An Adaptive Architecture for All Environments"; 2011; 25 pages.
VFoglight Alarms: Overview—Demo 6; 2009; 31 pages.
Quest Software, Inc.; "Foglight 5.5.8: Managing Dependency Mapping User Guide"; 2011; 53 pages.
Cappelli, Will; "APM Needs Three-Layered Application Materials"; Gartner Research; Feb. 26, 2010; 5 pages.
Microsoft; "What is System Center Advisor?"; http://onlinehelp.microsoft.com/en-us/advisor/ff962512(printer).aspx; accessed on Apr. 5, 2011; 2 pages.
Microsoft; "Microsoft System Center Advisor"; https://www.systemcenteradvisor.com/; accessed on Apr. 4, 2011; 2 pages.
Microsoft; "Windows Management Instrumentation (WMI): Frequently Asked Questions: Troubleshooting and Tips"; http://technet.microsoft.com/en-us/library/ee692772(d=printer).aspx; Microsoft TechNet; Jul. 28, 2004; 20 pages.
Maston, Michael; "Managing Windows with WMI"; http://technet.microsoft.com/en-us/library/bb742445(d=printer).aspx; Nov. 1, 1999; 11 pages.
U.S. Appl. No. 14/562,474, Rustad et al.
U.S. Appl. No. 14/249,147, Rustad et al.
U.S. Appl. No. 14/292,135, Rustad.
U.S. Appl. No. 14/619,897, Diep et al.
U.S. Appl. No. 14/858,341, Qin et al.
Layered Technologies, Inc., "Optimized Application Performance and User Experience: Application Performance Management Service," 2013, 4 pages.
Levey, Tom, "Monitoring the Real End User Experience," www.appdynamics.com, Jul. 25, 2013, 7 pages.
Quarles, John et al.; "A Mixed Reality Approach for Merging Abstract and Concrete Knowledge"; IEEE Virtual Reality 2008; Mar. 8-12, 2008; pp. 27-34.
Aternity, Inc., "Aternity Virtual Desktop Monitoring: Get Visibility into all Tiers of the Virtual Desktop," http://www.aternity.com/products/workforce-apm/virtual-desktop-monitoring/, May 11, 2014, 2 pages.
Solarwinds Worldwide. LLC., "SolarWinds: Virtualization Manager Administrator Guide," DocVersion 6.3.0.1, Sep. 8, 2015, 321 pages.
EG Innovations, Inc., "eG Enterprise Performance Monitoring for Citrix XenDesktop: Performance Assurance for Citrix Virtual Desktops," www.eginnovations.com, accessed on Sep. 17, 2015, 2 pages.
EG Innovations, Inc., "Service Overview: VDI Performance Assessment: Move VDI Deployments from Test to Best," www.eginnovations.com, accessed on Sep. 17, 2015, 2 pages.

(56) References Cited

OTHER PUBLICATIONS

EG Innovations, Inc., "Total Performance Monitoring for Citrix XenApp and XenDesktop," www.eginnovations.com, accessed on Sep. 17, 2015, 2 pages.
Goliath Technologies, "Goliath Performance Monitor: for Citrix XenApp & XenDesktop," http://goliathtechnologies.com, May 2014, 2 pages.
Goliath Technologies, "Goliath Performance Monitor: for VMware,"http://goliathtechnologies.com, May 2014, 2 pages.
VMTurbo, "VDI Control Module," http://vmturbo.com, Nov. 2014, 2 pages.
VMTurbo, "VMTurbo Operations Manager: Demand-Driven Control for Cloud and Virtualization," http://vmturbo.com, Jun. 2015, 2 pages.

* cited by examiner

SYSTEMS AND METHODS FOR MULTILAYER MONITORING OF NETWORK FUNCTION VIRTUALIZATION ARCHITECTURES

BACKGROUND

Technical Field

The present disclosure relates generally to resource monitoring and more particularly, but not by way of limitation, to systems and methods for multilayer monitoring of virtual network functions.

History of Related Art

In a multilayered heterogeneous computing environment, fault events can happen at any layer. For many architectures, it is not easy to tell how a fault event at one layer relates to components residing at other layers.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes, responsive to deployment of at least one component of a virtual network function (VNF) in a multilayer network function virtualization (NFV) architecture, creating an integrated topology model (ITM) instance of interconnected topology objects. The ITM instance includes a physical infrastructure topology model (PITM) instance comprising first interconnected topology objects, the first interconnected topology objects representing a plurality of monitored physical resources residing at a physical infrastructure layer of the multilayer NFV architecture, wherein interconnections between the first interconnected topology objects reflect relationships between the plurality of monitored physical resources. The ITM instance further includes a virtual infrastructure topology model (VITM) instance comprising second interconnected topology objects, the second interconnected topology objects representing a plurality of monitored virtual resources residing at a virtual infrastructure layer of the multilayer NFV architecture, wherein the plurality of monitored virtual resources are physically implemented at the physical infrastructure layer, wherein interconnections between the second interconnected topology objects reflect relationships between the plurality of monitored virtual resources. The ITM instance also includes a network service topology model (NSTM) instance comprising third interconnected topology objects, the third interconnected topology objects representing a plurality of monitored virtual network resources residing at a network service layer of the multilayer NFV architecture, wherein the monitored virtual network resources are virtually realized at the virtual infrastructure layer, wherein interconnections between the third interconnected topology objects reflect relationships between the plurality of monitored virtual network resources. In addition, the ITM instance includes inter-model linking information usable to relate at least some of the third interconnected topology objects to at least some of the second interconnected topology objects. In addition, the method includes generating dependencies between the interconnected topology objects of the ITM instance based, at least in part, on the inter-model linking information, such that the dependencies include: a dependency of at least one of the third interconnected topology objects on at least one of the second topology objects; and a dependency of at least one of the second interconnected topology objects on at least one of the first interconnected topology objects. Further, the method includes generating a dependency graph for the multilayer NFV architecture based, at least in part, on the dependencies. The method also includes outputting at least a portion of the dependency graph for presentation to a user.

In one embodiment, an information handling system includes a processor. The processor is operable to implement a method. The method includes, responsive to deployment of at least one component of a virtual network function (VNF) in a multilayer network function virtualization (NFV) architecture, creating an integrated topology model (ITM) instance of interconnected topology objects. The ITM instance includes a physical infrastructure topology model (PITM) instance comprising first interconnected topology objects, the first interconnected topology objects representing a plurality of monitored physical resources residing at a physical infrastructure layer of the multilayer NFV architecture, wherein interconnections between the first interconnected topology objects reflect relationships between the plurality of monitored physical resources. The ITM instance further includes a virtual infrastructure topology model (VITM) instance comprising second interconnected topology objects, the second interconnected topology objects representing a plurality of monitored virtual resources residing at a virtual infrastructure layer of the multilayer NFV architecture, wherein the plurality of monitored virtual resources are physically implemented at the physical infrastructure layer, wherein interconnections between the second interconnected topology objects reflect relationships between the plurality of monitored virtual resources. The ITM instance also includes a network service topology model (NSTM) instance comprising third interconnected topology objects, the third interconnected topology objects representing a plurality of monitored virtual network resources residing at a network service layer of the multilayer NFV architecture, wherein the monitored virtual network resources are virtually realized at the virtual infrastructure layer, wherein interconnections between the third interconnected topology objects reflect relationships between the plurality of monitored virtual network resources. In addition, the ITM instance includes inter-model linking information usable to relate at least some of the third interconnected topology objects to at least some of the second interconnected topology objects. In addition, the method includes generating dependencies between the interconnected topology objects of the ITM instance based, at least in part, on the inter-model linking information, such that the dependencies include: a dependency of at least one of the third interconnected topology objects on at least one of the second topology objects; and a dependency of at least one of the second interconnected topology objects on at least one of the first interconnected topology objects. Further, the method includes generating a dependency graph for the multilayer NFV architecture based, at least in part, on the dependencies. The method also includes outputting at least a portion of the dependency graph for presentation to a user.

In one embodiment, a computer-program product includes a non-transitory computer-usable medium having computer-readable program code embodied therein. The computer-readable program code is adapted to be executed to implement a method. The method includes, responsive to deployment of at least one component of a virtual network function (VNF) in a multilayer network function virtualization (NFV) architecture, creating an integrated topology model (ITM) instance of interconnected topology objects. The ITM instance includes a physical infrastructure topology model (PITM) instance comprising first interconnected topology objects, the first interconnected topology objects representing a plurality of monitored physical resources residing at a physical infrastructure layer of the multilayer NFV architecture, wherein interconnections between the first interconnected topology objects reflect relationships between the plurality of monitored physical resources. The ITM instance further includes a virtual infrastructure topology model (VITM) instance comprising second interconnected topology objects, the second interconnected topology objects representing a plurality of monitored virtual resources residing at a virtual infrastructure layer of the multilayer NFV architecture, wherein the plurality of monitored virtual resources are physically implemented at the physical infrastructure layer, wherein interconnections between the second interconnected topology objects reflect relationships between the plurality of monitored virtual resources. The ITM instance also includes a network service topology model (NSTM) instance comprising third interconnected topology objects, the third interconnected topology objects representing a plurality of monitored virtual network resources residing at a network service layer of the multilayer NFV architecture, wherein the monitored virtual network resources are virtually realized at the virtual infrastructure layer, wherein interconnections between the third interconnected topology objects reflect relationships between the plurality of monitored virtual network resources. In addition, the ITM instance includes inter-model linking information usable to relate at least some of the third interconnected topology objects to at least some of the second interconnected topology objects. In addition, the method includes generating dependencies between the interconnected topology objects of the ITM instance based, at least in part, on the inter-model linking information, such that the dependencies include: a dependency of at least one of the third interconnected topology objects on at least one of the second topology objects; and a dependency of at least one of the second interconnected topology objects on at least one of the first interconnected topology objects. Further, the method includes generating a dependency graph for the multilayer NFV architecture based, at least in part, on the dependencies. The method also includes outputting at least a portion of the dependency graph for presentation to a user.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
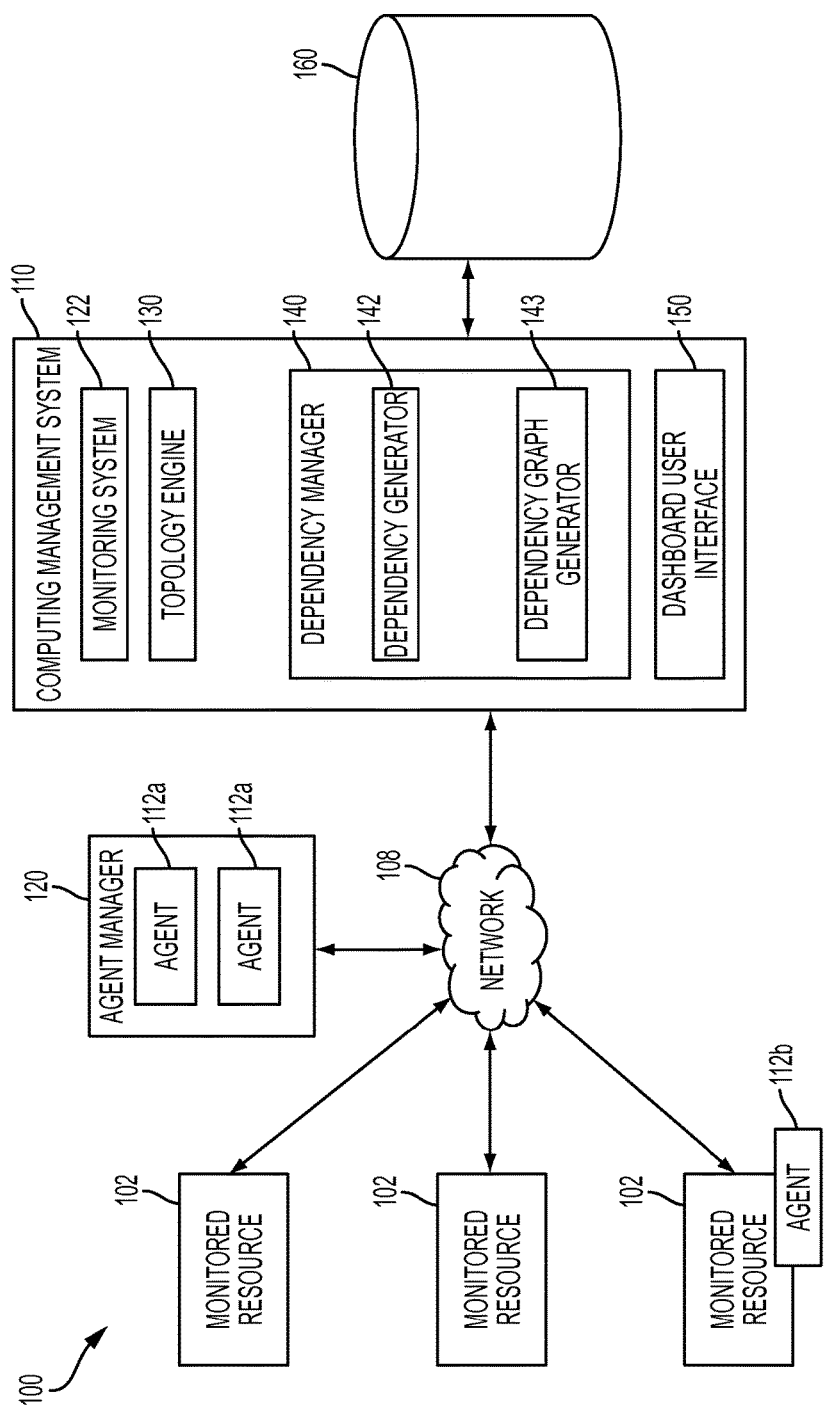
FIG. 1 illustrates an example computing environment.

Information Technology (IT) professionals often struggle to understand what infrastructure and application components actually support a given application. While the general architecture of a computing environment is rarely a complete mystery, it is equally rare that IT professionals have the full details at their fingertips. Most often, information about interactions between computing systems and resources is out of date or incomplete, stored in a combination of spreadsheets, Microsoft Visio™ diagrams, and configuration management databases.

More particularly, Network Function Virtualization (NFV) can be used to efficiently enable network-based services by deploying virtualized network functions (VNFs) as software on standardized and programmable hardware systems. In general, NFV is a network architecture concept that utilizes IT virtualization related technologies to virtualize entire classes of network node functions into building blocks that may be connected, or chained, to create communication services. NFV typically relies upon, but differs from, traditional server virtualization techniques such as those used in enterprise IT.

A VNF can include, for example, one or more VNF components (VNFCs). In various embodiments, VNFCs can be implemented as one or more virtual containers (e.g., virtual machines, Linux containers, etc.) running different software and processes, on top of industry-standard high-volume servers, switches and storage, or even cloud computing infrastructure, instead of having custom hardware appliances for each network function. In some cases, a VNFC can correspond to a virtual machine image. As an example of VNF utilization, a virtualized session border controller function could be deployed to protect a network without the typical cost and complexity of obtaining and installing physical units. Other examples of NFV include virtualized load balancers, firewalls, intrusion detection devices and WAN (wide area network) accelerators.

NFV has the potential to revolutionize the telecommunications industry by reducing the cost of the equipment and increasing the revenue with virtualized services. However, NFV also creates numerous technical challenges. Many of these technical challenges relate to monitoring NFV-based architectures. Since network functions are traditionally realized by proprietary hardware equipment, monitoring functionality likewise traditionally focuses on hardware equipment. In the case of NFV, however, network services are typically provided by a combination of standardized hardware, virtualized infrastructure and VNFs as applications deployed in a computing environment.

In such a multilayered heterogeneous computing environment, events could occur in VNFs, in virtualized hardware that virtually realize the VNFs, and/or in hardware responsible for physical implementation. Events can include, for example, detected occurrences or actions that deviate from what is expected and/or that merit special handling. For events occurring in lower layers of an NFV architecture, such as in physical and virtual infrastructure layers, it might be possible to apply various techniques for event collection such as, for example, propagation and correlation within the same layer. However, such collection efforts would generally fail to provide useful information regarding other layers when, for example, there is a physical link down at the physical infrastructure layer. Propagating such events up to a network service layer that contains, for example, VNFCs, is a technical problem, solutions to which are anything but straightforward.

One way to approach the above technical problem might be to attempt to design a singular data model for collecting data across layers. Somewhat disadvantageously, however, generating a singular data model for collecting data across layers would likely be rigid. For example, existing monitoring systems or commercial products might already contain at least some monitoring capabilities in lower layers of an NFV architecture, such as in physical and virtual infrastructure layers. More specifically, some products might contain separate subsystems with separate data models associated with these layers. Utilization of a singular data model would be less adaptive and integrative relative to these data models. In many cases, these data models can provide significant value to an organization.

The present disclosure describes examples of leveraging and expanding monitoring capabilities of existing monitoring solutions to provide for NFV monitoring. In certain embodiments, disparate data models relating, for example, to a physical infrastructure layer, a virtual infrastructure layer and a network service layer of a computing environment can be integrated using linking information. In certain embodiments, a dependency graph can be generated from an instance of an integrated data model. Advantageously, in various embodiments, the dependency graph can be used to graphically depict and propagate events across layers in an NFV architecture. For example, in certain embodiments, a system administrator or other user can be enabled not only to view events at the layer at which they occurred (e.g., at the physical infrastructure layer) but also to quickly understand an impact to corresponding virtual infrastructure and network services.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. In some embodiments, any component or element referred to herein as a "computer" or a "system" can be an information handling system as defined above, unless specifically stated otherwise or otherwise understood within the context as used.

FIG. 1 illustrates an example computing environment 100 for implementing an embodiment of a computing management system 110. The computing environment 100 includes monitored resources 102 that are monitored by a monitoring system 122 of the computing management system 110. The monitoring system 122 can monitor the resources 102 for performance tuning reasons, troubleshooting, or other reasons. The computing management system 110 can track relationships between the resources 102 to facilitate monitoring of the resources 102.

The monitored resources 102 may, for instance, include devices in a data center or in a plurality of data centers. Some examples of the monitored resources 102 include the following: VNFs, VNFCs, virtual machines, servers, web servers, application servers, databases, applications, processors, memories, hard drives or other storage devices, peripherals, software components, database tables, tablespaces in a database, application tiers, network switches and other network hardware, combinations of same, and/or the like. The monitored resources 102 can be geographically separate or colocated.

In particular, the monitored resources 102 can be arranged into a plurality of layers that are each monitored by a plurality of subsystems of the monitoring system 122. For example, the monitored resources 102 can include a combination of physical resources, virtual resources and NFV-specific resources in distinct layers of an NFV-based architecture. An example of the plurality of layers will be described with respect to FIG. 3. An example of the plurality of subsystems will be described with respect to FIG. 4.

An agent manager 120 communicates with the monitoring system 122, for example, over a network 108, which can be a local area network (LAN) and/or a WAN (which may include the Internet). The agent manager 120 includes agents 112a, which can be hardware or software modules that collect data about the monitored resources 102 for submission to the monitoring system 122. This data can include performance data, status data, configuration data, combinations of the same, or the like.

In certain embodiments, one or more topology engines 130 of the computing management system 110 access, and in some cases create, a physical infrastructure topology model (PITM), a virtual infrastructure topology model (VITM) and a network service topology model (NSTM) for corresponding layers of the monitored resources 102. The PITM can be a data model usable to store representations of inherent relationships between those of the monitored resources 102 residing at a physical infrastructure layer such as, for example, physical hardware for computing, storage and networking. Resources residing at the physical infrastructure layer will periodically be referred to herein as physical resources. The VITM can be a data model usable to store representations of inherent relationships between those of the monitored resources 102 residing at a virtual infrastructure layer, periodically referred to herein as virtual resources. The NSTM can be a data model usable to store representations of inherent relationships between those of the monitored resources 102 residing at a network service layer, periodically referred to herein as virtual network resources.

In some embodiments, the computing management system 110 may receive or retrieve the PITM, the VITM and the NSTM, which models may be generated by other system components. The one or more topology engines 130 can store the PITM, the VITM and the NSTM in a data store 160, which can include physical computer storage, one or more databases, one or more file systems, or any combination of the same. Examples of the PITM, the VITM and the NSTM will be described with respect to FIGS. 6, 8 and 9, respectively. The one or more topology engines 130 can link the PITM, the VITM and the NSTM into an integrated topology model (ITM). The ITM can include the PITM, the VITM, the NSTM and inter-model linking information that relates the topology models together.

The one or more topology engines 130 can create an instance of the ITM at runtime (e.g., when a VNFC is deployed). In that way, the ITM instance can include instances of the PITM, the VITM and the NSTM along with inter-model linking information that relates the PITM, VITM and NSTM instances together. Thereafter, the computing management system 110 can leverage the ITM instance to further create a dependency model that tracks dynamic relationships or dependencies between the resources 102 across layers. Dependency information can provide IT personnel with a visualization of which resources 102 affect the performance of other resources 102, other segments of an organization, etc. Troubleshooting and performance tuning can thereby be facilitated.

In each respective instance of the PITM, VITM and NSTM maintained by the computing management system 110, resources from a corresponding layer of the monitored resources 102 can be considered an object, and data collected about each object can be stored therein. The agents 112a can collect this monitoring data (or object data) remotely by querying libraries or application programming interfaces (API) of the monitored resources 102. For example, the agents 112a can make web service calls to one or more of the monitored resources 102 to obtain monitoring data. The agents 112a can collect this monitoring data periodically, for example, according to a schedule, on-demand, or a combination of the same. Some monitored resources 102 may include one or more agents 112b installed locally with the monitored resources 102. For example, if a monitored resource 102 is a virtual machine, an agent 112b can run from within the virtual machine to obtain monitoring data.

The monitoring data may include information about attributes, characteristics, or properties of the monitored resources 102, such as the number of processors in a physical host device, memory or storage capacity, hardware or software specifications, virtual machine characteristics, and so forth. The monitoring data can also include information about the performance of the monitored resources 102. For virtual machines, this performance information may include information about characteristics such as virtual machines per physical host, virtual machine memory allocations, processor load, memory load, remaining free storage, network bandwidth, network latency, or any of a variety of other parameters. This performance data can also include detected events such as alarms or alerts that indicate whether certain monitored resource 102 characteristics are outside of established performance criteria.

The agents 112a, 112b provide the collected monitoring data to the monitoring system 122. The monitoring system 122 can include one or more physical or virtual servers that process the monitoring data. The one or more topology engines 130 can transform the monitoring data into the ITM instance. As noted above, the ITM instance typically includes the PITM, VITM and NSTM instances. The PITM, VITM and NSTM instances can each include a plurality of interrelated topology objects, where each topology object can represent one of the monitored resources 102. Each topology model instance can be a graph or the like, where nodes in the graph represent objects or monitored resources 102 and edges connecting the nodes represent existing relationships between the objects.

For example, a set of monitored resources 102 may include a virtual machine, a hypervisor on which the virtual machine runs and a physical host computing device upon which the hypervisor runs. The one or more topology engines 130 can transform data representing each of these monitored resources 102 into topology objects that are related to each other in the PITM, the VITM, or the NSTM by virtue of their inherent physical or virtual relationships. An inherent relationship between a virtual machine and a hypervisor, for instance, may be that the virtual machine runs on the hypervisor. Similarly, an inherent relationship between a hard disk and a physical host device may be that the hard disk is a component of the physical host device.

Figure 2:
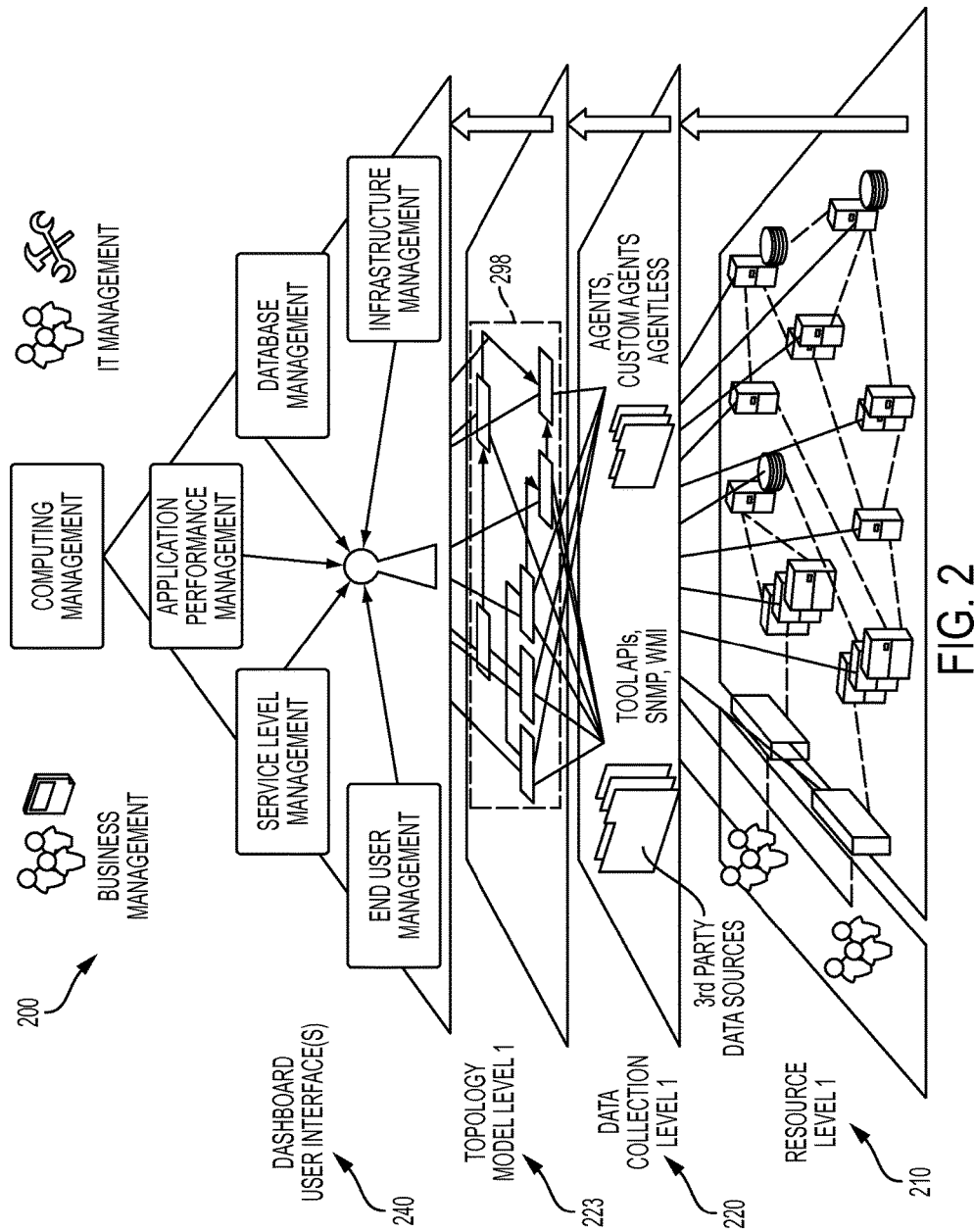
FIG. 2 illustrates an example computing management architecture.

In FIG. 2, an example computing management architecture 200 is shown. The computing management architecture 200 can be implemented by the computing management system 110. The computing management architecture 200 includes a resource level 210, which can include the monitored resources 102 of FIG. 1, a data collection level 220, which can include the agents 112a, 112b of FIG. 1, a topology model level 223, including an ITM instance 298 (e.g., the ITM instance described above with respect to FIG. 1), and a dashboard user interface level 240. The computing management architecture 200, as illustrated in FIG. 2, shows how information from a multilayered computing environment can be gathered from one or more monitored resources in the resource level 210 and transformed through the data collection level 220 into a real-time topology model represented by the ITM instance 298, which model is capable of dynamically representing the complex interconnected nature of the computing environment. The dashboard user interface level 240 can provide fully customizable views for conducting detailed analyses and presenting results.

The resource level 210 can encompass the multilayer computing environment being monitored. The software or hardware components (e.g., monitored resources 102) that the computing management system 110 can automatically discover can include (as a non-limiting list of examples): VNFs; VNFCs; any device with a network address, such as an IP address; network devices, such as switches, routers and wireless access points; physical hosts or virtual hosts, including the following virtualization examples: VMware™ (ESX Servers, data centers, data stores, resource pools, clusters, virtual machines), Hyper-V™ (clusters, servers, virtual Machines), Solaris™ zones and containers, and IBM™ AIX partitions (e.g., logical partitions (LPARs), workload partitions (WPARs), or other *PARs); any process running on a server; threads within processes; web servers; Java™ and .NET™ Applications (e.g., enterprise applications and web applications); databases, such as Oracle™ and SQL Server™ databases; physical host components, such as CPU, memory and hard disk storage; and storage area network components, such as RAID arrays, controllers, Fiber channel components and SCSI components.

In the data collection level 220, as described above, agents 112 can be used for data collection. In addition, the computing management system 110 can use other sources for data collection, such as agent-less collection, third party sources (e.g., monitoring tools like IBM™ Tivoli Enterprise Console or HP™ OVO, specialized domain monitoring tools, APIs, SNMP, Windows Management Instrumentation (WMI), scripts, combinations of the same, or the like). As data is collected, the computing management system 110 can create, or build, one or more topology model instances (e.g., instances of PITMs, VITMs, NSTMs, ITMs, etc.), in the topology model level 223, by transforming incoming data into a collection-independent form called a canonical data transformation. During transformation, for example, the one or more topology engines 130 of the computing management system 110 can use context data to build objects of a particular type using a respective topology model. For example, with regard to the PITM instance, when collecting system data, the one or more topology engines 130 can use the name of a resource (such as a host name) to create an object for that resource with the same name as the name of the resource.

Example implementations for collecting data and creating various types of topology models are described in the following U.S. Patents and Applications, each of which is hereby incorporated by reference in its entirety: U.S. Pat. No. 7,979,245, filed May 16, 2007, titled "Model-Based Systems and Methods for Monitoring Computing Resource Performance," ("the '245 patent"), U.S. patent application Ser. No. 12/370,399 ("the '399 application"), U.S. patent application Ser. No. 13/658,709 ("the '709 application"), and U.S. patent application Ser. No. 13/658,724 ("the '724 application"). The computing management system 110 and/or agents 112 can implement some or all of the features described in the '245 patent, the '399 application, the '709 application and the '724 application.

The ITM can be leveraged to track observed dependencies between objects therein. Referring again to FIG. 1, the computing management system 110 includes a dependency manager 140 that can track dependencies. In the depicted embodiment, the dependency manager 140 includes an inter-model dependency generator 142 and a dependency graph generator. The inter-model dependency generator 142 can track observed dependencies (e.g., hardware and/or software, organizational or administrative, etc.) between model objects in a topology model.

In general, the inter-model dependency generator 142 can discover and model infrastructure and transactional dependencies. The inter-model dependency generator 142 can generate dependencies based on an analysis of the ITM instance and/or the PITM, VITM and NSTM instances on which the ITM is based. In some embodiments, the ITM instance and/or the PITM, VITM and NSTM instances are stored as tree abstract data types having one or more tree data structures. More generally, each topology model instance can be stored as a hierarchical data structure. The inter-model dependency generator 142 can then follow ancestor and/or descendant links in the one or more trees to infer dependency relationships among components. Dependencies can also be inferred or detected in the fashion described in the '709 application and the '724 application. In some cases, the dependencies generated by the inter-model dependency generator 142 can be stored in the data store 160.

The dependency graph generator 143 can use the generated dependencies stored in the data store 160 to generate a dependency model (e.g., a graph), which can also be stored in the data store 160. Dependencies can be output to users via the dashboard user interface 150. For example, dependency graphs can be output to users with connections drawn between dependent components. Other views can also be used to output dependency data, including tables.

Figure 3:
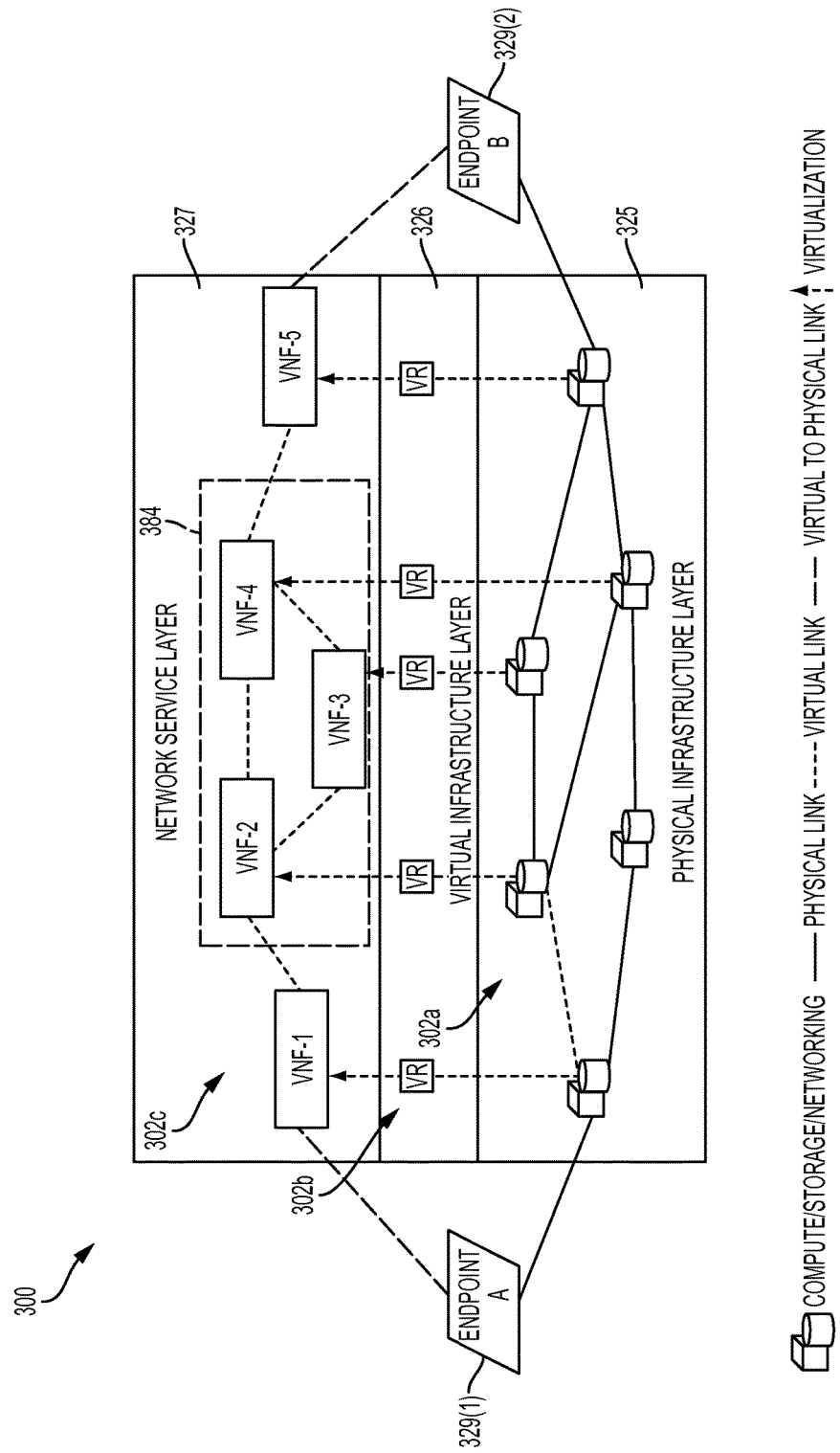
FIG. 3 illustrates an example of a multilayered architecture.

FIG. 3 illustrates an example of a multilayered architecture 300 that includes a physical infrastructure layer 325, a virtual infrastructure layer 326 and a network service layer 327. The physical infrastructure layer 325, the virtual infrastructure layer 326 and the network service layer 327 include physical resources 302a, virtual resources 302b and VNFs 302c, respectively. As illustrated, the VNFs 302c of the network service layer 327 operate on the virtual resources 302b of the virtual infrastructure layer 326, which further operate on the physical resources 302a of the physical infrastructure layer 325.

The network service layer 327 can provide application-level network services such as, for example, a network service 384, to users. For illustrative purposes, the network service 384 is shown to include an aggregation of the VNFs 302c. In general, the physical resources 302a, the virtual resources 302b and the VNFs 302c, collectively, can be considered an example arrangement of the monitored resources 102 of FIG. 1.

In certain embodiments, network services at the network service layer 327 can integrate, or include, physical network functions (PNFs). In general, PNFs represent physical hardware components that can coexist with VNFs to provide a network service such as the network service 384. In various cases, PNFs can be representative of legacy functions that, historically, have been deployed exclusively at a physical layer similar to the physical infrastructure layer 325. Physical endpoints 329(1) and 329(2) are shown as examples physical hardware that can constitute all or part of a PNF.

Figure 4:
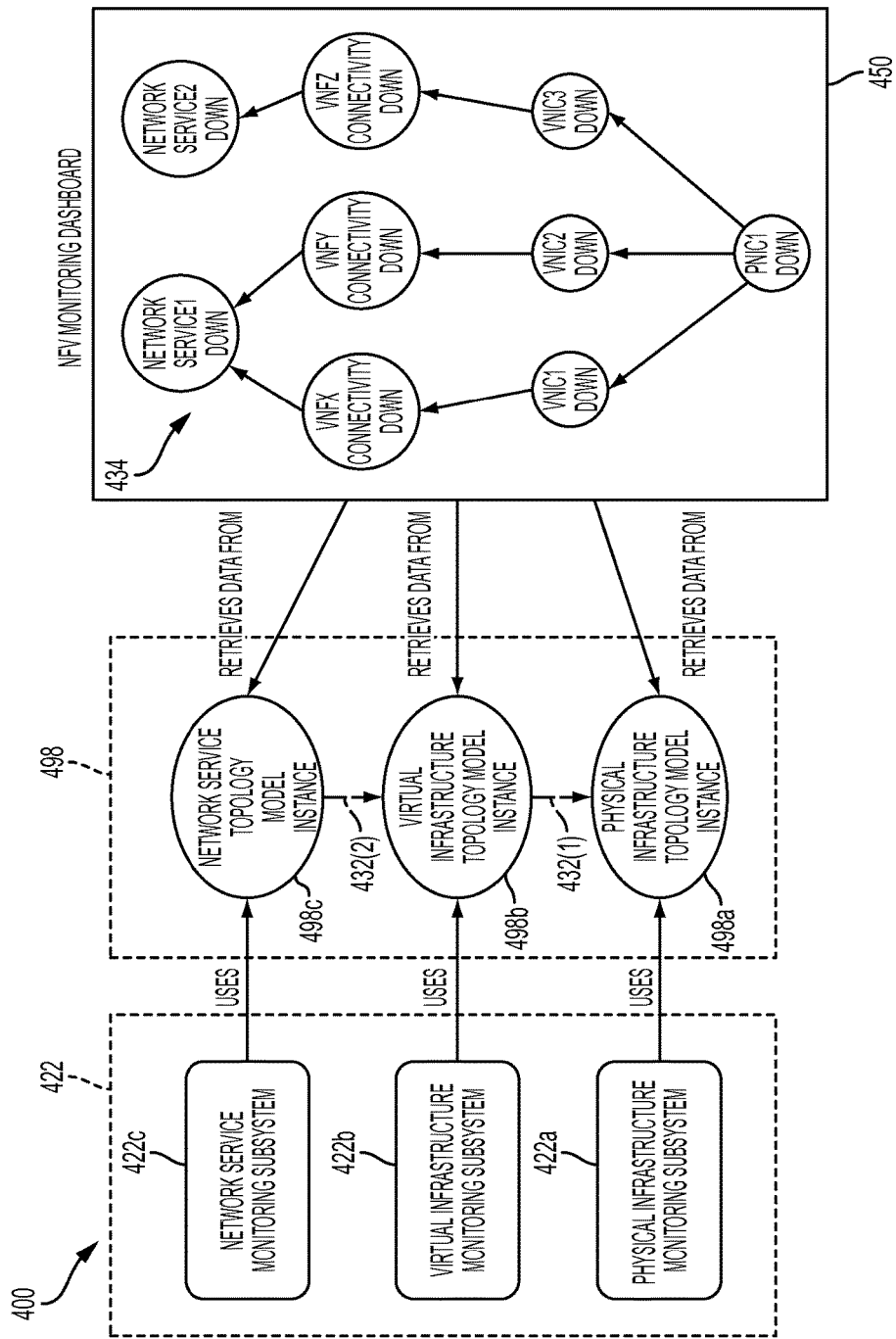
FIG. 4 illustrates an example of monitoring resources residing at a plurality of layers.

FIG. 4 illustrates an example 400 of monitoring resources residing at a plurality of layers. The example 400 includes a monitoring system 422, an ITM instance 498 and an NFV monitoring dashboard 450. In general, the monitoring system 422 can operate as described with respect to the monitoring system 122 of FIG. 1. As illustrated, the monitoring system 422 can include a physical infrastructure monitoring subsystem 422a, a virtual infrastructure monitoring subsystem 422b and a network service monitoring subsystem 422c.

In certain embodiments, the physical infrastructure monitoring subsystem 422a, the virtual infrastructure monitoring subsystem 422b and the network service monitoring subsystem 422c can monitor resources that reside at the physical infrastructure layer 325, the virtual infrastructure layer 326 and the network service layer 327, respectively, of FIG. 3. For example, as depicted in FIG. 4, the physical infrastructure monitoring subsystem 422a, the virtual infrastructure monitoring subsystem 422b and the network service monitoring subsystem 422c can monitor the physical resources 302a, the virtual resources 302b and the VNFs 302c, respectively, of FIG. 3, and store resulting monitoring data in a PITM instance 498a, a VITM instance 498b and a NSTM instance 498c, respectively.

Further, in various embodiments, the ITM instance 498 can be formed from the PITM instance 498a, the VITM instance 498b and the NSTM instance 498c as a result of inter-model linking information contained therein which enables discovery of dependencies. In particular, in various cases, the VITM instance 498b can have one or more discoverable dependencies 432(1) on the PITM instance 498a. In an example, one or more objects of the VITM instance 498b (e.g., an object representing a virtual machine) can depend on one or more objects of the PITM instance 498a (e.g., an object representing a physical host). Additionally, in various cases, the NSTM instance 498c can have one or more discoverable dependencies 432(2) on the VITM instance 498b. For example, one or more objects of the NSTM instance 498c (e.g., an object representing a particular VNF) can depend on one or more objects of the VITM instance 498b (e.g., a virtual machine involved in implementing the particular VNF). More specific examples of the discoverable dependencies 432(1) and the discoverable dependencies 432(2) will be described in relation to FIG. 10.

The NFV monitoring dashboard 450 can retrieve monitoring data from the ITM instance 498 and output the monitoring data in relation to a dependency graph 434. In certain embodiments, as a result of the discoverable dependencies 432(1) and the discoverable dependencies 432(2), the NFV monitoring dashboard 450 can intelligently integrate monitoring data stored in the PITM instance 498a, the VITM instance 498b and the NSTM instance 498c and propagate events across multiple layers. For example, as illustrated in the example of the dependency graph 434, a physical link that is down (i.e., PNIC1) can be propagated to virtual links that use the physical link (i.e., VNIC1, VNIC2 and VNIC 3), to VNFs that use the virtual links (i.e., VNFX, VNFY and VNFZ) and to network services that rely upon the VNFs (i.e., NetworkService1 and NetworkService2).

Figure 5:
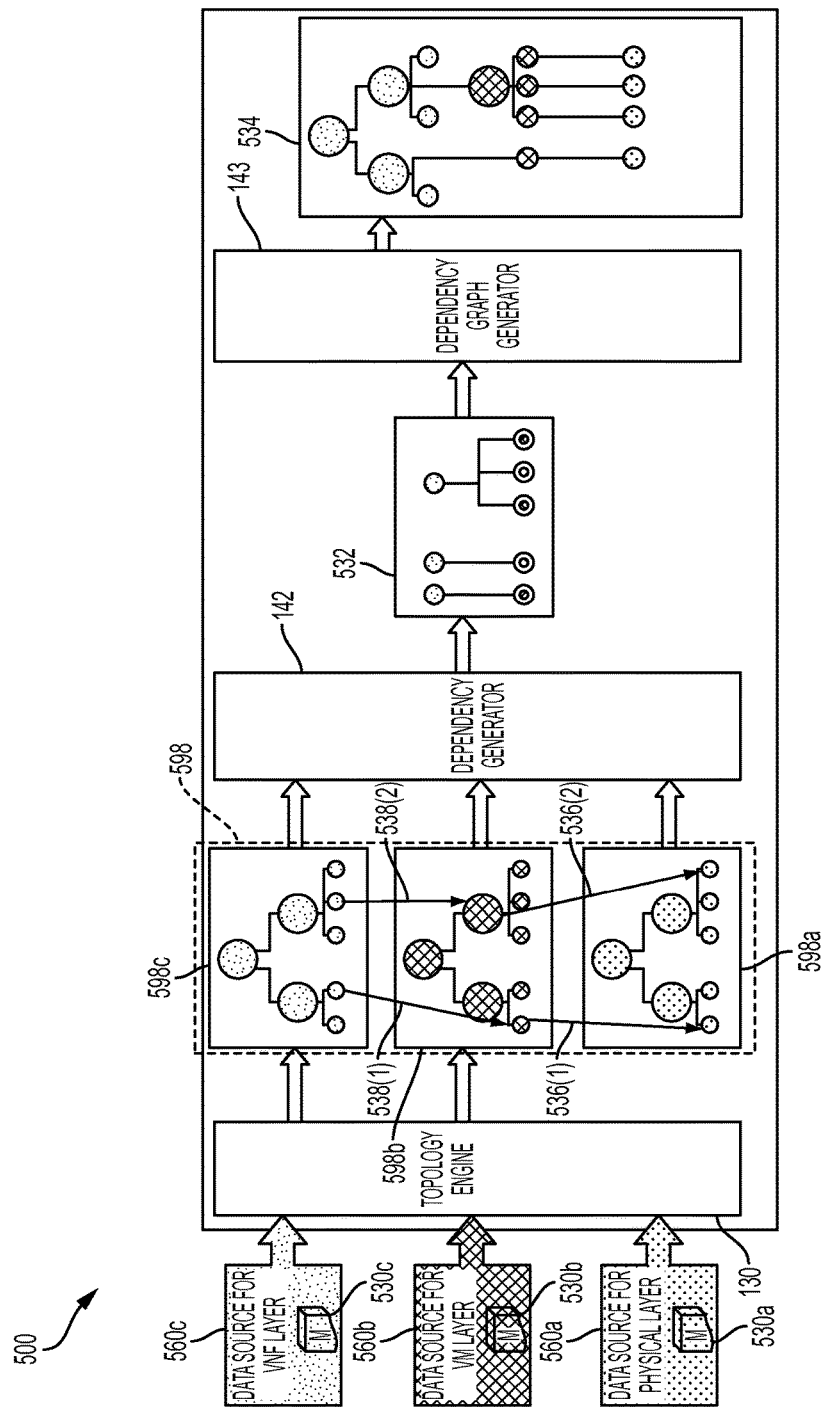
FIG. 5 illustrates an example of operation of a computing environment with specific regard to integrated topology models (ITMs).

FIG. 5 illustrates a more detailed example 500 of operation of the computing environment 100 of FIG. 1 with specific regard to ITMs. As shown, the topology engine 130 receives a PITM 530a, a VITM 530b and a NSTM 530c from data sources 560a, 560b and 560c, respectively. It should be appreciated that, in various embodiments, the data sources 560a, 560b and 560c can each be the data store 160 of FIG. 1. In these embodiments, the topology engine 130 can receive the PITM 530a, the VITM 530b and the NSTM 530c from the data store 160. In general, the PITM 530a, the VITM 530b and the NSTM 530c can relate to distinct layers as described with respect to FIG. 3.

The topology engine 130 creates an ITM instance 598 from the PITM 530a, the VITM 530b and the NSTM 530c. The ITM instance 598 can generally include a PITM instance 598a, a VITM instance 598b and a NSTM instance 598c. In addition, the ITM instance 598 can include inter-model linking information that enables discovery, at run-time, of cross-layer dependencies between topology objects of the PITM instance 598a, the VITM instance 598b and the NSTM instance 598c. For example, as shown, the ITM instance 598 includes discoverable dependencies 536(1), 536(2), 538(1) and 538(2). Example operation of the topology engine 130 will be described in greater detail in relation to FIG. 13.

The inter-model dependency generator 142 generates dependencies between the interconnected objects of the ITM instance 598. For example, in the illustrated embodiment in which the PITM instance 598a, the VITM instance 598b and the NSTM instance 598c are represented as trees, the inter-model dependency generator 142 can traverse each topology model in depth-first fashion to generate internal dependencies within each instance. In addition, the inter-model dependency generator 142 can generate cross-layer dependencies using the inter-model linking information. In general, the inter-model dependency generator 142 can produce a collection of dependencies 532.

The dependency graph generator 143 can generate a dependency graph or model 534 that depicts the collection of dependencies 532 in the fashion described above. The dependency graph or model 534 can serve as the basis for an NFV monitoring dashboard such as the NFV monitoring dashboard 450 described with respect to FIG. 4. The collection of dependencies 532 can be updated, for example, in response to change notifications to add specific dependencies or to remove specific dependencies. In addition, in some cases, dependencies can be refreshed, for example, by deleting the collection of dependencies 532 and re-running a discovery process. Example operation of the inter-model dependency generator 142 and the dependency graph generator 143 will be described in greater detail in relation to FIGS. 14-15.

Figure 6:
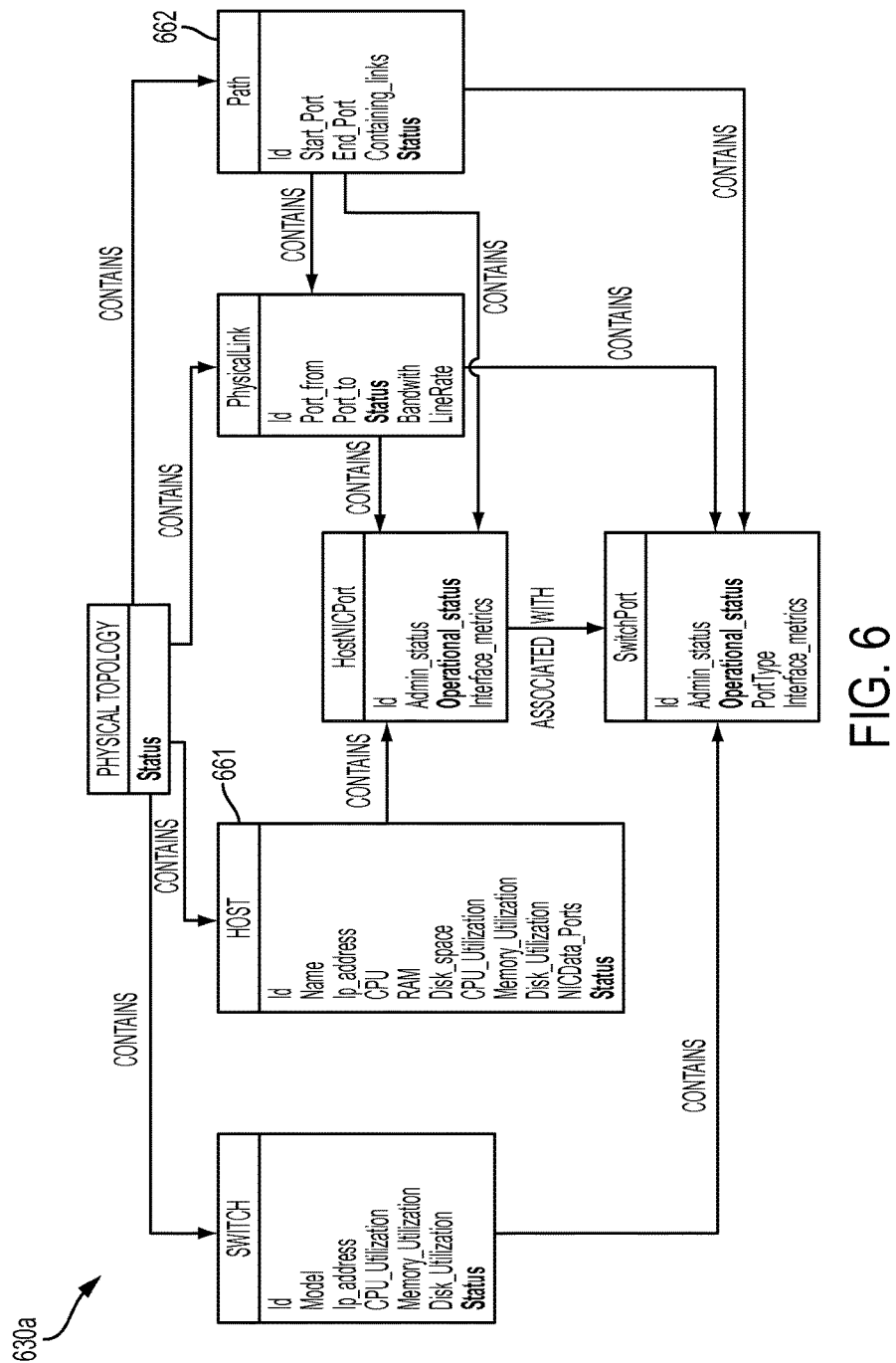
FIG. 6 illustrates an example data model for a physical infrastructure topology model (PITM).

FIG. 6 illustrates an example data model 630a for a PITM. In various embodiments, the data model 630a can be considered an example of how the PITM instance 498a and the PITM instance 598a of FIGS. 4 and 5, respectively, can be structured. For example, in some implementations, the PITM instance 498a and the PITM instance 598a of FIGS. 4 and 5, respectively, could be created by instantiating object types of the data model 630a. The data model 630a includes a plurality of interrelated topology object types. For illustrative purposes, the data model 630a shows topology object types related to physical networking. It should be appreciated that, in various implementations, PITMs can be structured differently from the example of the data model 630a.

For example, as illustrated, one of the interrelated topology object types of the data model 630a is a physical host object type 661. Objects of the physical host object type 661 can represent physical hosts in a PITM. The physical host object type 661 can have various relationships (e.g., "contains" relationships) with various other topology object types, which topology object types can be related to still other topology object types, etc. The physical host object type 661 can have attributes related, for example, to included CPUs, RAM, disk space, etc.

In the illustrated embodiment, another of the interrelated topology object types of the data model 630a is a physical path object type 662. In certain embodiments, objects of the physical path object type 662 can represent physical connectivity between two physical endpoints (e.g., "Start_Port" and "End_Port" in FIG. 6). Typically, each physical endpoint of an object of the physical path object type 662 corresponds to a physical network interface (e.g., "HostNICPort" or "SwitchPort" as shown in FIG. 6) that is contained by a physical host (e.g., an object of the physical host object type 661), a network switch (e.g., an object of a "switch" object type), etc. In an example, an object of the physical path object type 662 could represent a path between two hosts (e.g., a path between two objects of a "HostNIC-Port" object type, which are contained by respective objects of the physical host object type 661). In various cases, there can be multiple physical paths between two physical endpoints. In such cases, distinct objects of the physical path object type 662 can represent each such physical path.

Figure 7:
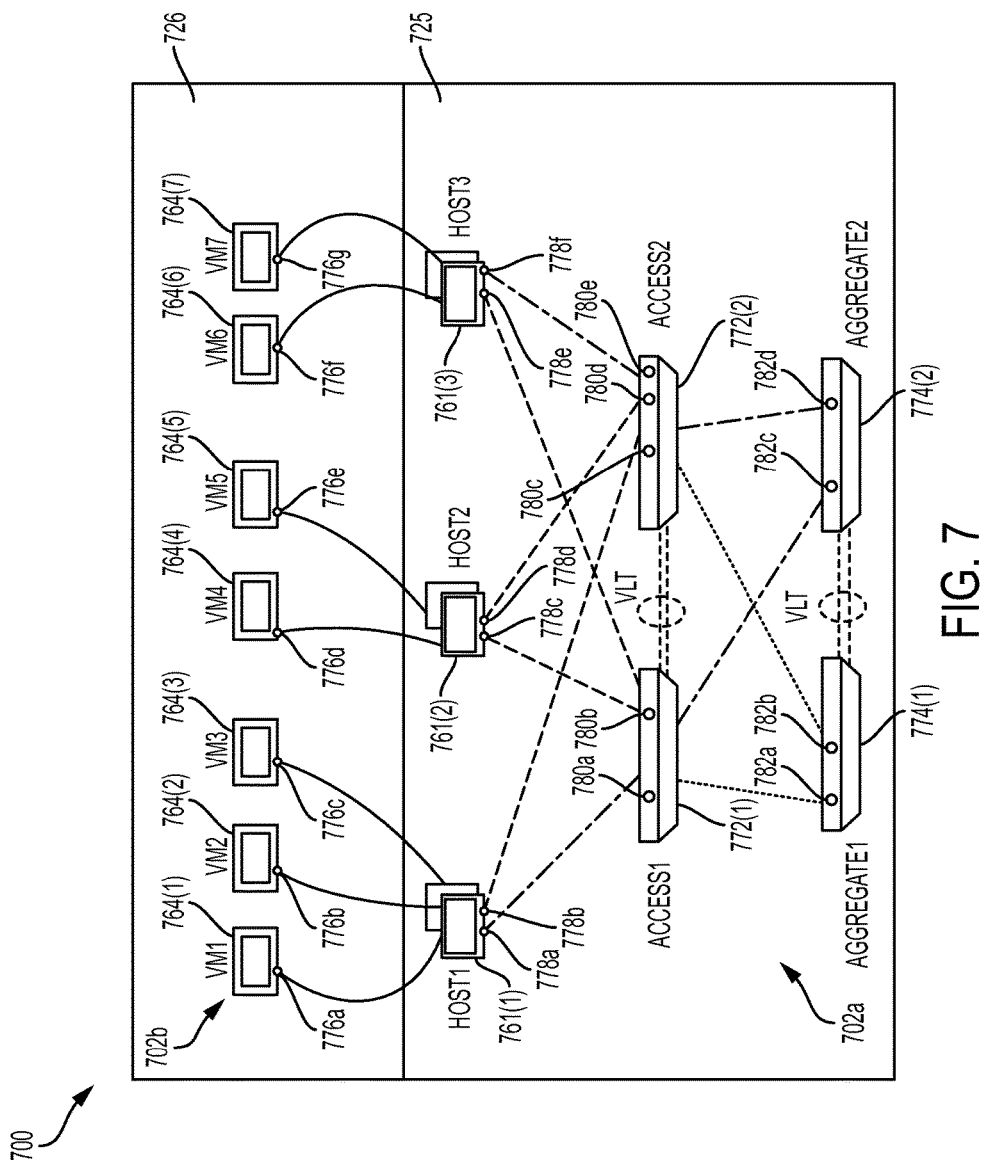
FIG. 7 illustrates an example of multiple physical paths between physical hosts.

FIG. 7 illustrates an example 700 of multiple physical paths between physical hosts. The example 700 includes resources 702*a* at a physical infrastructure layer 725 and resources 702*b* at a virtual infrastructure layer 726. The resources 702*a* include physical hosts 761(1), 761(2) and 761(3) (collectively, physical hosts 761), access switches 772(1) and 772(2) (collectively, access switches 772) and aggregation switches 774(1) and 774(2) (collectively, aggregation switches 774). The resources 702*b* can include virtual machines 764(1), 764(2), 764(3), 764(4), 764(5), 764(6) and 764(7). Although virtual machines are illustrated in FIG. 7, it should be appreciated that other containers such as, for example, Linux containers, can also be used.

In the illustrated embodiment, the physical hosts 761(1), 761(2) and 761(3) have physical network interfaces 778*a* and 778*b*, physical network interfaces 778*c* and 778*d* and physical network interfaces 778*e* and 778*f*, respectively. The physical network interfaces 778*a-f* can be, or include, physical network interface controllers (NICs). The access switches 772(1) and 772(2) have network ports 780*a* and 780*b* and network ports 780*c*, 780*d* and 780*e*, respectively, which serve as physical network interfaces. The aggregation switches 774(1) and 774(2) have network ports 782*a* and 782*b* and network ports 782*c* and 782*d*, respectively, which may also be considered physical network interfaces. The virtual machines 764(1)-(7) have virtual network interfaces 776*a-g*, respectively.

In the example of FIG. 7, redundant physical paths between the hosts 761 are illustrated. In certain embodiments, virtual link trunking (VLT) can be used to create the redundant physical paths. In various cases, redundant physical paths can be advantageous. For example, when one path has problems, a redundant path can take over to support connectivity between physical hosts.

For example, two physical paths between the physical network interface 778*a* of the physical host 761(1) and the physical network interface 778*f* of the physical host 761(3) are shown in FIG. 7. A first path can begin with the physical network interface 778*a* of the physical host 761(1) and flow through the port 780*a* of the access switch 772(1), the port 782*a* of the aggregate switch 774(1), the port 782*b* of the aggregate switch 774(1) and the port 780*e* of the access switch 772(2) to the physical network interface 778*f* of the physical host 761(3). A second path can begin with the physical network interface 778*a* of the physical host 761(1) and flow through the port 780*a* of the access switch 772(1), the port 782*c* of the aggregate switch 774(2), the port 782*d* of the aggregate switch 774(2) and the port 780*e* of the access switch 772(2) to the physical network interface 778*f* of the physical host 761(3). In certain embodiments, the data model 630*a* and, in particular, objects of the physical path object type 662, can be used to store path information for physical paths such as the two example physical paths described above.

Figure 8:
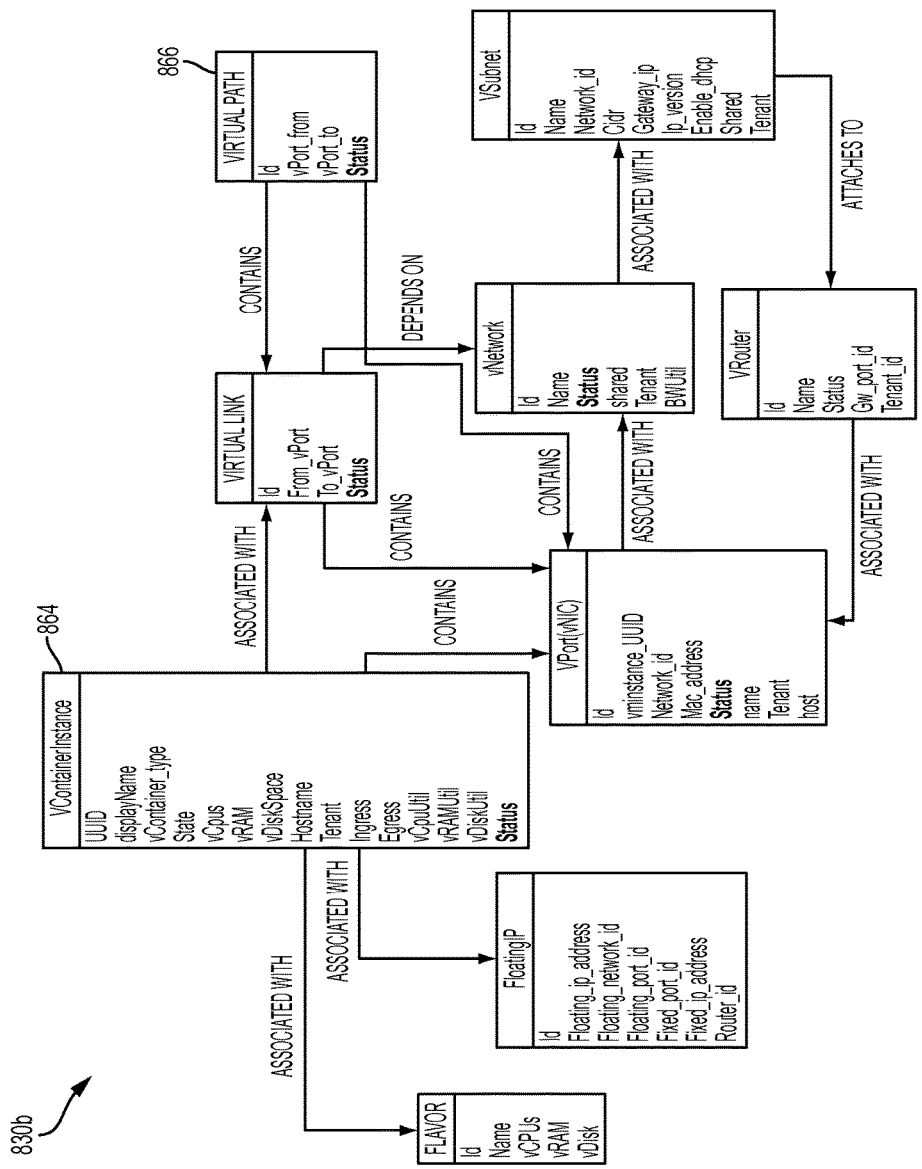
FIG. 8 illustrates an example of a data model for a virtual infrastructure topology model (VITM).

FIG. 8 illustrates an example of a data model 830*b* for a VITM. In various embodiments, the data model 830*b* can be considered an example of how the VITM instance 498*b* and the VITM instance 598*b* of FIGS. 4 and 5, respectively, can be structured. For example, in some implementations, the VITM instance 498*b* and the VITM instance 598*b* of FIGS. 4 and 5, respectively, could be created by instantiating object types of the data model 830*b*. The data model 830*b* includes a plurality of interrelated topology object types. For illustrative purposes, the data model 830*b* shows topology object types related to virtual networking. In certain embodiments, the data model 830*b* can be used to model virtual containers, virtual network interfaces, virtual routers, virtual networks, combinations of same, and/or the like. It should be appreciated that, in various implementations, VITMs can be structured differently from the example of the data model 830*b*.

In particular, as illustrated, the interrelated topology object types of the data model 830*b* can include a virtual container object type 864 and a virtual path object type 866. In general, objects of the virtual container object type 864 can represent a virtual environment that is provisioned various resources such as, for example, CPUs, memory, block I/O, network resources, etc. In some embodiments, the virtual container object type 864 can be instantiated to represent, for example, a virtual machine, a Linux container instance, etc.

The virtual path object type 866 can represent a virtual path between two virtual network interfaces such as, for example, the virtual network interfaces 776 of FIG. 7. As illustrated, any given virtual path modeled using the virtual path object type 866 can include one or more individual virtual links between virtual network interfaces. In a typical embodiment, virtual paths represented by objects of the virtual path object type 866 are managed at a virtual infrastructure layer such as, for example, the virtual infrastructure layer 326 of FIG. 3 or the virtual infrastructure layer 726 of FIG. 7 but are physically realized at a physical infrastructure layer such as, for example, the physical infrastructure layer 325 of FIG. 3 or the physical infrastructure layer 725 of FIG. 7. In certain embodiments, a dependency can be created between objects of the virtual path object type 866 and objects representing corresponding physical connectivity provided by the physical infrastructure layer.

For example, in the illustrated embodiment, objects of the virtual path object type 866 can contain two virtual network interfaces as virtual endpoints (e.g., "VPort_From" and "vPort_To"). Each virtual network interface of a given virtual path can be correspond to a physical host (e.g., via a "host" attribute of a "vPort" object). The physical host to which a given virtual endpoint corresponds can be represented, for example, using the physical host object type 661 of the data model 630*a* of FIG. 6. As described with respect to FIG. 6, the physical path object type 662 of the data model 630*a* can represent physical paths between two physical endpoints. In this fashion, a virtual path represented using the virtual path object type 866 can be implemented by, and therefore depend on, one or more physical paths that can be represented, for example, by physical path objects of the physical path object type 662 of FIG. 6.

In an example, referring again to FIG. 7, the virtual machines 764 and, more specifically, the virtual network interfaces 776 thereof, are each shown to be implemented on one of the physical hosts 761. A virtual path between any two virtual machines can correspond to physical paths between physical hosts on which the virtual machines are implemented. In the above description of FIG. 7, two example physical paths are described between the physical network interface 778*a* of the physical host 761(1) and the physical network interface 778*f* of the physical host 761(3). In similar fashion, these example physical paths can physically implement virtual paths between virtual network interfaces implemented on the physical host 761(1) and the physical host 761(3) (e.g., a virtual path between the virtual machine 764(1) and the virtual machine 764(7)).

Figure 9:
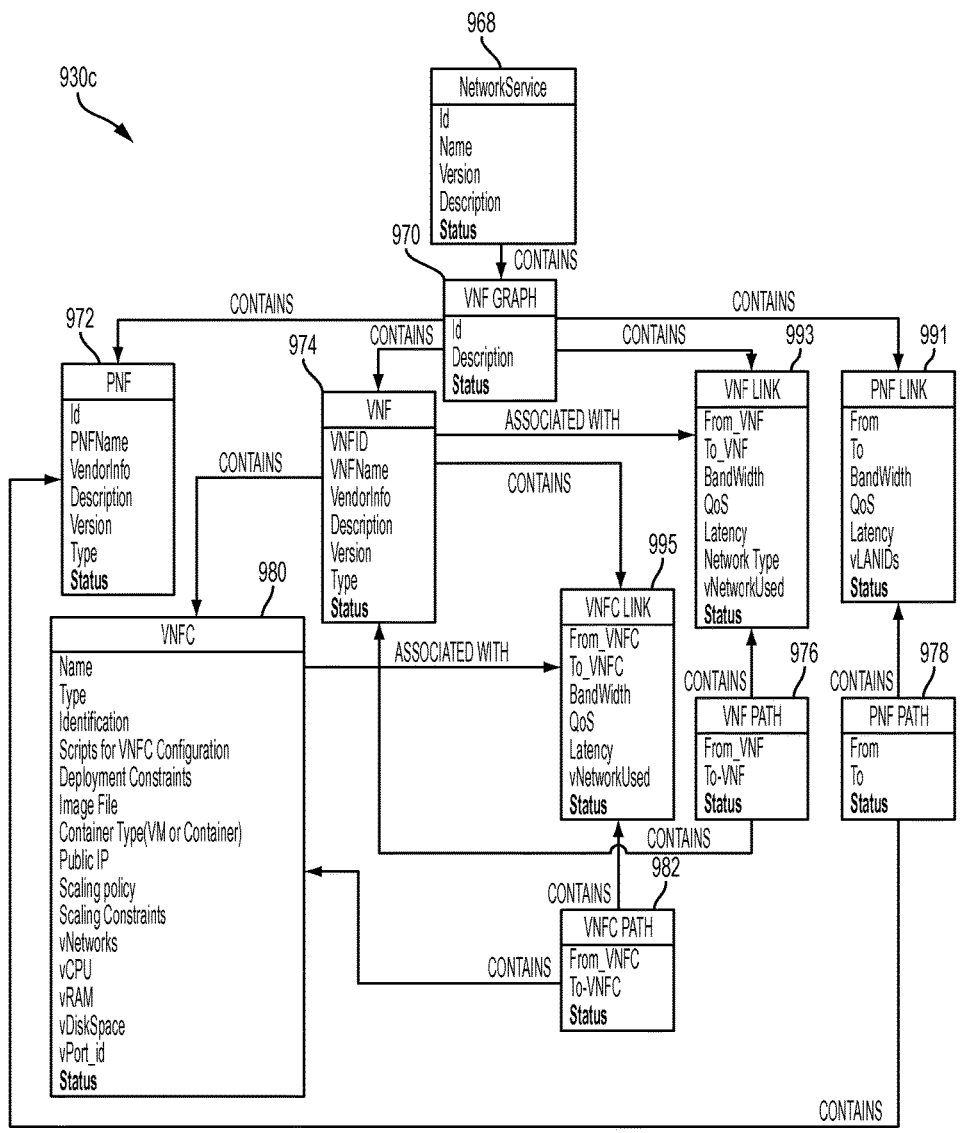
FIG. 9 illustrates an example of a data model for a network service topology model (NSTM).

FIG. 9 illustrates an example of a data model 930c for a NSTM. In various embodiments, the data model 930c can be considered an example of how the NSTM instance 498c and the NSTM instance 598c of FIGS. 4 and 5, respectively, can be structured. For example, in some implementations, the NSTM instance 498c and the NSTM instance 598c of FIGS. 4 and 5, respectively, could be created by instantiating object types of the data model 930c. The data model 930c includes a plurality of interrelated topology object types.

For illustrative purposes, the data model 930c shows topology object types related to VNF communication. In certain embodiments, the data model 930c can model VNFs, VNFCs, etc. It should be appreciated that, in various implementations, NSTMs can be structured differently from the example of the data model 930c. For example, in the illustrated embodiment, the data model 930c includes a network service object type 968 that can be utilized to model a network service such as, for example, the network service 384 of FIG. 3.

A VNF graph object type 970 can represent, in a hierarchical graph structure, NFV architectures that provide network services of the network service object type 968. A VNF graph represented by the VNF graph object type 970 can include, or contain, one or more objects of a PNF object type 972, a VNF object type 974, a VNF link object type 993 and a PNF link object type 991.

The PNF object type 972 can be used to model PNFs of the type described with respect to FIG. 3. The PNF link object type 991 can be used to represent individual links between a source node and a physical endpoint that constitutes all or part of a PNF. In various cases, the source node can be a VNF, another physical endpoint (e.g., of another PNF), combinations of same, and/or the like. The physical endpoint can be similar, for example, to the physical endpoints 329(1) and 329(2) of FIG. 3. Objects of a PNF path object type 978 can be used to represent a path from a source node to a physical endpoint that constitutes all or part of a PNF. In general, paths modeled using the PNF path object type 978 include, or contain, one or more objects of the PNF link object type 991, which objects make up the paths.

The VNF object type 974 can be used to model VNFs of the type described above. The VNF link object type 993 can be used to represent individual virtual links between VNFs of the VNF object type 974. Objects of a VNF path object type 976 typically represent a path between two VNFs represented by the VNF object type 974. In general, paths modeled using the VNF path object type 976 include, or contain, one or more objects of the VNF link object type 993, which objects make up the paths.

A VNF represented by the VNF object type 974 can include, or contain, one or more objects of a VNFC object type 980 and a VNFC link object type 995. As described previously, VNFs can be implemented as a combination of VNFCs. In certain embodiments, one or more objects of the VNFC object type 980 can be used to model VNFCs that make up a VNF which is represented using the VNF object type 974. In certain embodiments, each VNFC modeled by the VNFC object type 980 can be implemented by a virtual container (e.g., a virtual machine or a Linux container) modeled by the virtual container object type 864 of FIG. 8 (e.g., a one-to-one mapping). The VNFC link object type 995 can represent individual virtual links between VNFCs of the VNFC object type 980. Objects of a VNFC path object type 982 typically represent a path between two VNFCs represented by the VNFC object type 980. In general, paths modeled using the VNFC path object type 982 include, or contain, one or more objects of the VNFC link object type 995, which objects make up the paths.

Figure 10:
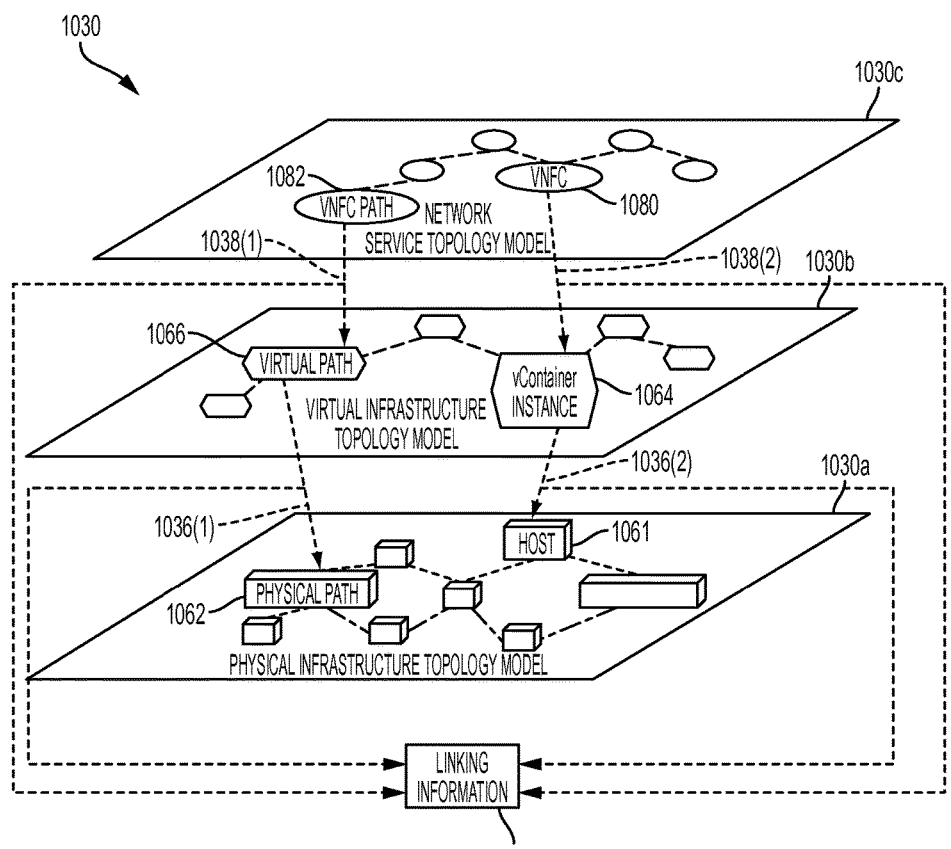
FIG. 10 illustrates an example of an ITM.

FIG. 10 illustrates an example of an ITM 1030. The ITM 1030 includes a PITM 1030a, a VITM 1030b, a NSTM 1030c and inter-model linking information 1086. In certain embodiments, the PITM 1030a, the VITM 1030b and the NSTM 1030c can be modeled, or represented, using the data models 630a, 830b and 930c, respectively, or another data model. In this fashion, the PITM 1030a, the VITM 1030b and the NSTM 1030c can each include interrelated topology objects similar to those illustrated in relation to the data models 630a, 830b and 930c, respectively. In addition, the PITM 1030a, the VITM 1030b and the NSTM 1030c can represent resources residing at a physical infrastructure layer, a virtual infrastructure layer and a network service layer, respectively, in a fashion similar to that which is described above in relation to the multilayered architecture 300 of FIG. 3.

The PITM 1030a is shown to include, inter alia, a physical host object type 1061 and a physical path object type 1062 that can function as described in relation to the physical host object type 661 and the physical path object type 662, respectively, of FIG. 6. The VITM 1030b is shown to include, inter alia, a virtual container object type 1064 and a virtual path object type 1066 that can function as described in relation to the virtual container object type 664 and the virtual path object type 866, respectively, of FIG. 8. The NSTM 1030c is shown to include, inter alia, a VNFC object type 1080 and VNFC path object type 1082 that can function as described in relation to the VNFC object type 980 and the VNFC path object type 982, respectively, of FIG. 9. For simplicity of illustration and description, only two representative object types are specifically shown and described relative to each of the PITM 1030a, the VITM 1030b and the NSTM 1030c. In various embodiments, the PITM 1030a, the VITM 1030b and the NSTM 1030c can include any of the object types shown and/or described with respect to FIGS. 6, 8 and 9, respectively.

The ITM 1030 can be a strategic integration of the PITM 1030a, the VITM 1030b and the NSTM 1030c. In general, the integration enables exposure of dependencies between topology object types of the PITM 1030a, the VITM 1030b and the NSTM 1030c when the ITM 1030 is instantiated. As shown, the inter-model linking information 1086 of the ITM 1030 can be populated at runtime with information sufficient to identify the dependencies.

For example, as described above, VNFC paths and VNFCs (from the network service layer) are typically realized at the virtual infrastructure layer via virtual paths and virtual containers, respectively. Accordingly, in the illustrated embodiment, a discoverable dependency 1038(1) is shown between the VNFC path object type 1082 and the virtual path object type 1066 and a discoverable dependency 1038(2) is shown between the VNFC object type 1080 and the virtual container object type 1064. In that way, the discoverable dependency 1038(1) and the discoverable dependency 1038(2) can represent specific dependencies of the network service layer on the virtual infrastructure layer.

By way of further example, virtual paths and virtual containers are physically implemented at the physical infrastructure layer via physical paths and physical hosts, respectively. Accordingly, in the example of FIG. 10, a discoverable dependency 1036(1) is shown between the virtual path object type 1066 and the physical path object type 1062 and a discoverable dependency 1036(2) is shown between the virtual container object type 1064 and the physical host object type 1061. As illustrated, the discoverable dependency 1036(1) and the discoverable dependency 1036(2) can represent specific dependencies of the virtual infrastructure layer on the physical infrastructure layer.

Various inter-model linking techniques can be utilized with respect to the inter-model linking information 1086. In an example, the inter-model linking information 1086 can implement a linking-by-object technique. In certain embodiments, according to the linking-by-object technique, a separate object type (sometimes referred to herein as a "linking object type") can be designed to relate VNFC objects in a NSTM instance to corresponding virtual container objects in a VITM instance. At runtime (e.g., when one or more VNFCs are deployed), the linking object type can be instantiated and populated, for example, with information that maps an identifier of each VNFC object to an identifier of its corresponding virtual container object. An example of the linking-by-object technique will be described in relation to FIG. 11.

In another example, the inter-model linking information 1086 can implement a base-type-containment linking technique. In certain embodiments, according to the base-type-containment linking technique, VNFC object types and virtual container object types can inherit from a common base type. The common base type can be designed to include, as one or more attributes, information sufficient to link a given VNFC object from a NSTM instance to a given virtual container object from a VITM instance. Each VNFC object and each virtual container object can be populated with this information at the time of object creation (e.g., at runtime). Thus, a VNFC object, for example, can directly access, as an attribute, an identifier of its corresponding virtual container object. An example of the base-type-containment linking technique will be described in relation to FIG. 12.

Figure 11:
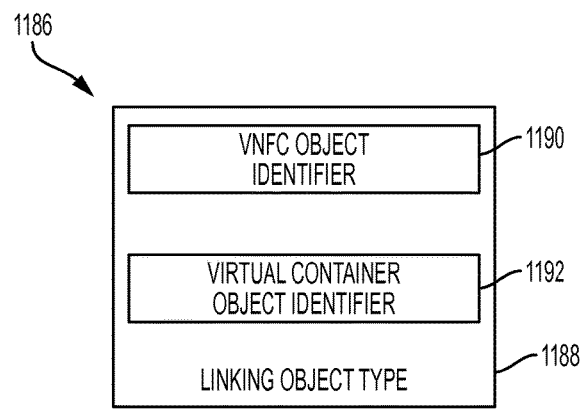
FIG. 11 illustrates an example of inter-model linking using a linking-by-object technique.

FIG. 11 illustrates an example of inter-model linking using the linking-by-object technique described above. In particular, inter-model linking information 1186 is shown. The inter-model linking information 1186 can include a linking object type 1188 that further includes, as attributes, a VNFC object identifier 1190 and a virtual container object identifier 1192. The VNFC object identifier 1190 typically identifies an object from a NSTM instance that represents a VNFC. For example, the VNFC object identifier 1190 can identify an instance of the VNFC object type 980 of FIG. 9. The virtual container object identifier 1192 typically identifies an object from a VITM instance that represents a virtual container on which the VNFC is realized. For example, the virtual container object identifier 1192 can identify an instance of the virtual container object type 864 of FIG. 8.

At runtime, for example, when one or more VNFCs are deployed, an ITM instance that includes the inter-model linking information 1186 can be created. At that time, as part of creating the ITM instance, an object of the linking object type 1188 can be created. For each deployed VNFC, the object of the linking object type 1188 can include a value for the VNFC object identifier 1190 (corresponding to the deployed VNFC) and a value for the virtual container object identifier 1192 (corresponding to a virtual container on which the deployed VNFC is virtually realized). In this fashion, the object of the linking object type 1188 can store information that links an object from a NSTM instance, which represents a given VNFC, and an object from a VITM instance, which represents a corresponding virtual container on which the given VNFC is virtually realized.

In certain embodiments, the linking object type 1188 enables a given object that models a particular VNFC and a corresponding object that models a particular virtual container on which the particular VNFC is virtually realized to be related in real-time within an ITM instance. As will be described in greater detail with respect to FIGS. 14-15, the inter-model linking information 1186 can be used to identify dependencies such as the discoverable dependencies 1036(1)-(2) and 1038(1)-(2) of FIG. 10.

Figure 12:
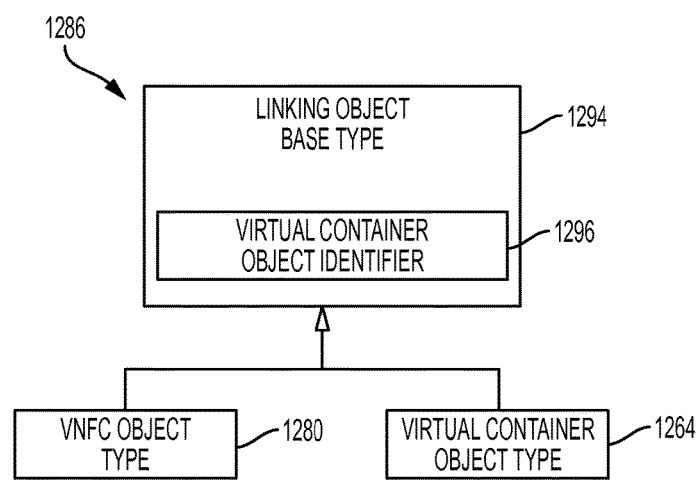
FIG. 12 illustrates an example of inter-model linking using a base-type-containment linking technique.

FIG. 12 illustrates an example of inter-model linking using the base-type-containment linking technique described above. In particular, inter-model linking information 1286 is shown. The inter-model linking information 1286 includes a linking object base type 1294, a VNFC object type 1280 and a virtual container object type 1264. The VNFC object type 1280 and the virtual container object type 1264 can function as described, for example, with respect to the VNFC object type 980 of FIG. 9 or the VNFC object type 1080 of FIG. 10. The virtual container object type 1264 can function as described, for example, with respect to the virtual container object type 864 of FIG. 8 or the virtual container object type 1064 of FIG. 10.

As shown, the linking object base type 1294 includes, as an attribute, a virtual container object identifier 1296. Using principles of inheritance, the VNFC object type 1280 and the virtual container object type 1264 can both be modified (or designed) to have the linking object base type 1294 as a parent base type. In this fashion, the VNFC object type 1280 and the virtual container object type 1264 can be considered sub-types of the linking object base type 1294 and therefore, in effect, also each have the virtual container object identifier 1296 as an attribute.

Advantageously, in certain embodiments, the linking object base type 1294 enables objects of the VNFC object type 1280 and the virtual container object type 1264 to be linked at runtime despite the fact that the objects originate from disparate data models. When a VNFC is deployed and, correspondingly, an ITM is created, an object of the VNFC object type 1280 and an object of the virtual container object type 1264 can be created for each deployed VNFC. The object of the VNFC object type 1280 corresponds to the deployed VNFC and the object of the virtual container object type 1264 corresponds to a virtual container (e.g., a virtual machine) on which the deployed VNFC is virtually realized. Due to inheritance principles described above, both objects are also objects of the linking object base type 1294. Consequently, both the object of the VNFC object type 1280 and the object of the virtual container object type 1264 can be populated with a value for the virtual container object identifier 1296. In general, the value corresponds to the virtual container on which the deployed VNFC is virtually realized.

In various embodiments, inheritance-facilitated inclusion of the virtual container object identifier 1296 in the VNFC object type 1280 as described above enables a given object of the VNFC object type 1280, which models a particular VNFC (in a NSTM instance), to be aware of a corresponding object of the virtual container object type 1264 (in a VITM instance) that models a virtual container on which the particular VNFC is virtually realized. As will be described in greater detail with respect to FIGS. 14-15, the inter-model linking information 1286 can be used to identify dependencies such as the discoverable dependencies 1036(1)-(2) and 1038(1)-(2) of FIG. 10.

Figure 13:
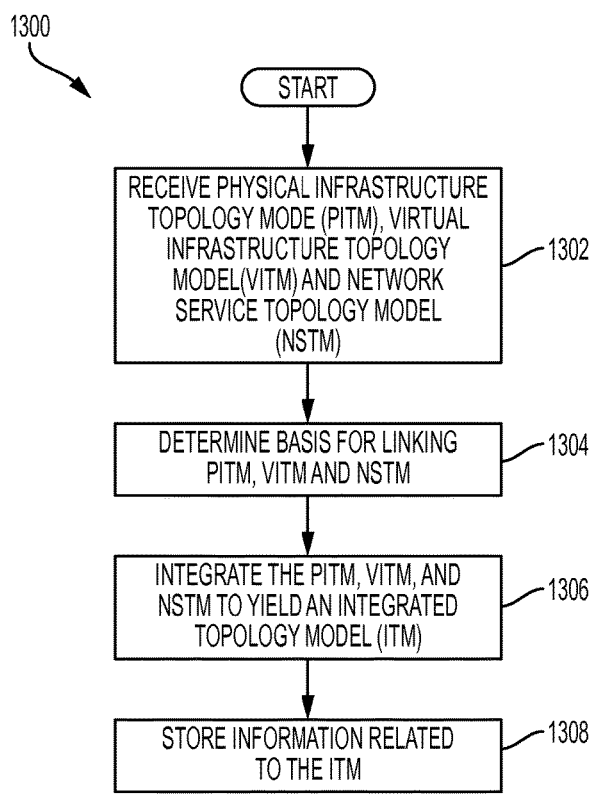
FIG. 13 illustrates an example of a process for designing an ITM.

FIG. 13 illustrates an example of a process 1300 for designing an ITM. In certain embodiments, the process 1300 can be triggered on-demand by an administrator, super user or other user. The process 1300 can be implemented by any system that can process data. For example, the process 1300, in whole or in part, can be implemented by one or more of the topology engine 130, the computing management system 110 and/or the data store 160 of FIG. 1. In some cases, the process 1300 can be performed generally by the computing environment 100. Although any number of systems, in whole or in part, can implement the process 1300, to simplify discussion, the process 1300 will be described in relation to particular components or systems of the computing environment 100 of FIG. 1.

At block 1302, the topology engine 130 receives a PITM, a VITM and a NSTM such as, for example, the data model 630*a* of FIG. 6, the data model 830*b* of FIG. 8 and the data model 930*c* of FIG. 9, respectively. In various embodiments, the topology engine 130 can receive the PITM, the VITM and the NSTM from the data store 160 responsive to a request.

At block 1304, the topology engine 130 determines a basis for linking the PITM, the VITM and/or the NSTM. In some embodiments, the basis for linking can be inter-model linking information similar to the inter-model linking information 1186 of FIG. 11. In other embodiments, the basis for linking can be inter-model linking information similar to the inter-model linking information 1286 of FIG. 12. In still other embodiments, the PITM, the VITM and/or the NSTM can be linked in other ways. In some cases, the basis for linking the PITM, the VITM and the NSTM can be input and/or selected by a user such as an administrator.

At block 1306, the topology engine 130 links the PITM, the VITM and/or the NSTM according to the determined basis for linking. For example, the topology engine 130 can generate and use inter-model linking information as described with respect to FIG. 11 or FIG. 12. In some embodiments, the topology engine 130 can interact with a user to perform the block 1306. In a typical embodiment, the block 1306 yields an ITM that includes the PITM, the VITM, the NSTM and the inter-model linking information. The ITM can be similar, for example, to the ITM 1030 of FIG. 10. At block 1308, the ITM is stored in the data store 160 and/or in other memory.

Figure 14:
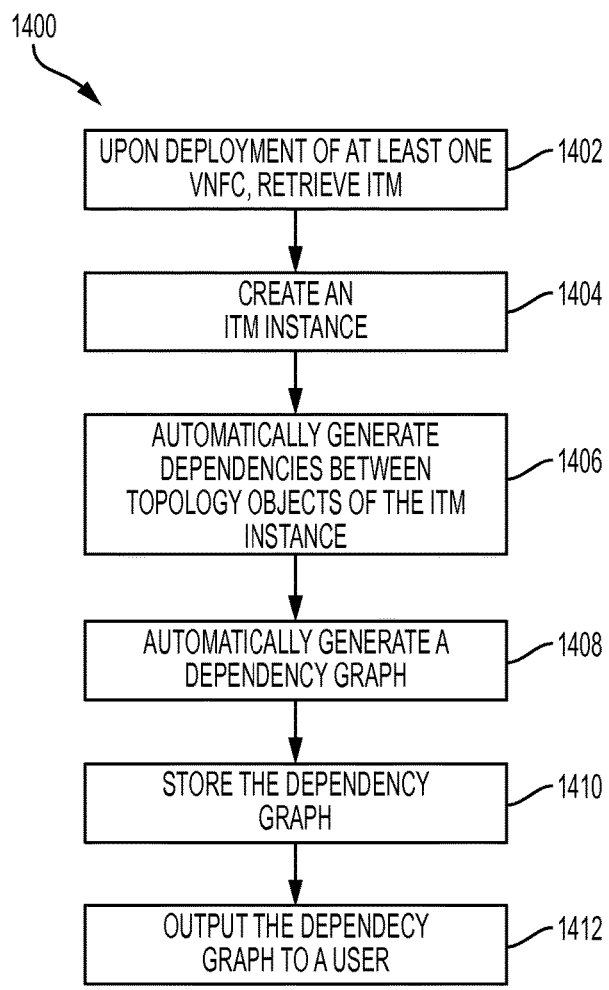
FIG. 14 illustrates an example of a process for using an ITM at runtime.

FIG. 14 illustrates an example of a process 1400 for using an ITM at runtime. In certain embodiments, the process 1400 can be triggered on-demand by an administrator, super user or other user. In addition, or alternatively, in certain embodiments, the process 1400 can be triggered by a deployment of a VNF and/or a VNFC. The process 1400 can be implemented by any system that can process data. For example, the process 1400, in whole or in part, can be implemented by one or more of the topology engine 130, the computing management system 110 and/or the data store 160 of FIG. 1. In some cases, the process 1400 can be performed generally by the computing environment 100. Although any number of systems, in whole or in part, can implement the process 1400, to simplify discussion, the process 1400 will be described in relation to particular components or systems of the computing environment 100 of FIG. 1.

At block 1402, the topology engine 130 retrieves an ITM. In certain embodiments, the ITM may have been created as described with respect to the process 1300 of FIG. 13. In some cases, the ITM can be retrieved from the data store 160.

At block 1404, the topology engine 130 creates an ITM instance. As described previously, the retrieved ITM typically includes a PITM, a VITM, a NSTM and inter-model linking information. In a typical embodiment, creating the ITM instance involves instantiating the PITM, the VITM, the NSTM and the inter-model linking information. In that way, the ITM instance typically includes a PITM instance, a VITM instance, a NSTM instance and instantiated inter-model linking information that, collectively, represent a runtime architecture similar to the multilayered architecture 300 of FIG. 3. The ITM instance can be similar, for example, to the ITM instance 598 of FIG. 5.

At block 1406, the inter-model dependency generator 142 automatically generates dependencies between topology objects of the ITM instance as described with respect to FIG. 5. The block 1406 can yield a collection of dependencies similar to the collection of dependencies 532 of FIG. 5. Examples of functionality that can be performed at the block 1406 will be described in relation to FIG. 15.

At block 1408, the dependency graph generator 143 automatically generates an end-to-end dependency graph as described with respect to FIG. 5. The dependency graph can be similar to the dependency graph or model 534 of FIG. 5. At block 1410, the dependency graph generator 143 stores a snapshot of the dependency graph, for example, in the data store 160. It should be appreciated that, in various embodiments, a snapshot of the dependency graph can be stored at any time. In some embodiments, storage may be omitted such that the process 1200 proceeds directly from block 1408 to block 1412. At block 1412, the dashboard user interface 150 outputs the dependency graph to a user, for example, for monitoring purposes. Examples of monitoring advantages of the dependency graph will be described in relation to FIG. 17.

Figure 15:
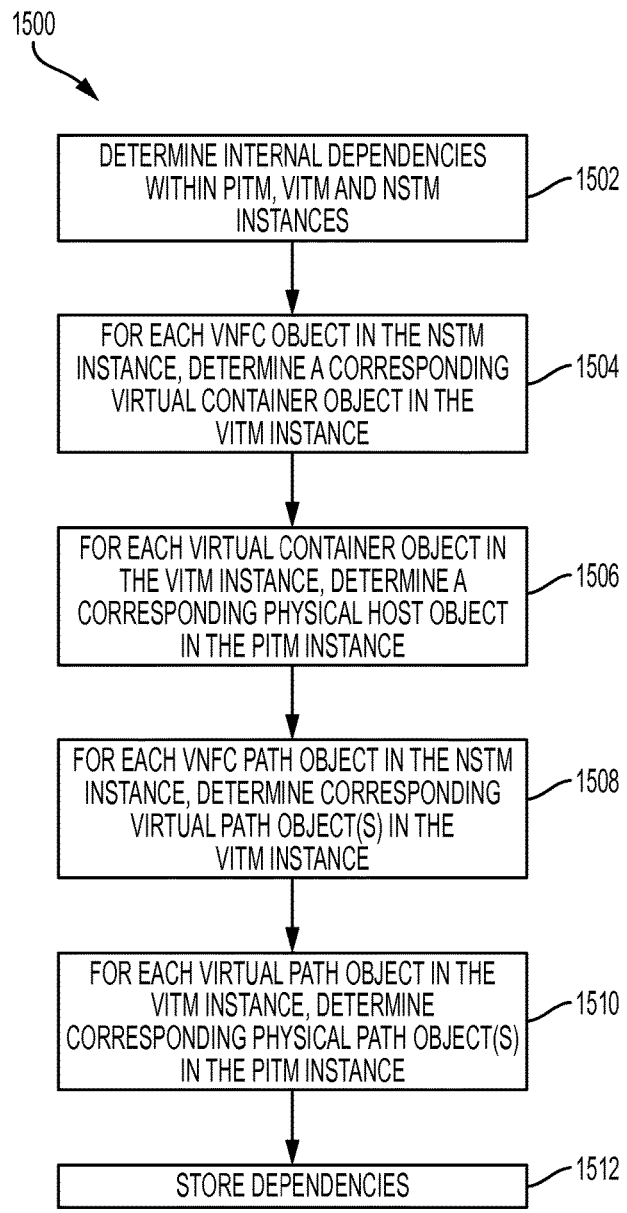
FIG. 15 illustrates an example of a process for automatically generating dependencies for an ITM instance.

FIG. 15 illustrates an example of a process 1500 for automatically generating dependencies for an ITM instance. For purposes of the example of FIG. 15, the ITM instance includes a PITM instance, a VITM instance, a NSTM instance and inter-model linking information. For illustrative purposes, the PITM, VITM and NSTM instances will be described as having a structure similar to that which is described above relative to FIGS. 6, 8 and 9, respectively. In certain embodiments, the process 1500 can be performed as all or part of the block 1406 of FIG. 14.

The process 1500 can be implemented by any system that can process data. For example, the process 1500, in whole or in part, can be implemented by one or more of the topology engine 130, the computing management system 110 and/or the data store 160 of FIG. 1. In some cases, the process 1500 can be performed generally by the computing environment 100. Although any number of systems, in whole or in part, can implement the process 1500, to simplify discussion, the process 1500 will be described in relation to particular components or systems of the computing environment 100 of FIG. 1.

At block 1502, the inter-model dependency generator 142 determines internal dependencies within each of the PITM instance, the VITM instance and the NSTM instance. In general, the internal dependencies can include inherent and/or inferred dependencies between topology objects as described above and in the '709 application and the '724 application.

At block 1504, for each VNFC object in the NSTM instance, the inter-model dependency generator 142 determines a corresponding virtual container object in the VITM instance. As described above, a VNFC represented by a given VNFC object can be implemented by, and therefore depend on, a virtual container (e.g., a virtual machine or other virtual container such as a Linux container) at a virtual infrastructure layer. The corresponding virtual container object for a given VNFC object can be a virtual container object that represents the implementing virtual container. In a typical embodiment, the block 1504 results in the discovery of dependencies similar to the discoverable dependency 1038(2) of FIG. 10.

In an example, if the ITM instance includes inter-model linking information similar to the inter-model linking information 1186 of FIG. 11 (i.e., a linking-by-object approach), a linking object of the linking object type 1188, or an object of a different object type, can be created at the time the ITM instance is instantiated. According to this example, the block 1504 could include traversing the NSTM instance and, for each VNFC object, looking up an identifier of the VNFC object in the linking object. In a typical embodiment, a matching entry in the linking object provides a virtual container object identifier of the corresponding virtual container object.

In another example, if the ITM instance includes inter-model linking information similar to the inter-model linking information 1286 of FIG. 12 (i.e., base-type-containment linking), each VNFC object can include a virtual container object identifier similar to the virtual container object identifier 1296 of FIG. 12. According to this example, the block 1504 could include traversing the NSTM instance and determining the virtual container object identifier stored by each VNFC object. In general, for each VNFC object, the virtual container object identifier stored therein exposes the corresponding virtual container object. It should be appreciated that, although the foregoing examples are provided, the corresponding virtual container object can also be determined in other ways.

At block 1506, for each virtual container object in the VITM instance, the inter-model dependency generator 142 determines a corresponding physical host object in the PITM instance. For example, in certain embodiments, each virtual container object can identify a physical host on which a modeled virtual container depends (e.g., by host name as shown in FIG. 8). According to this example, an identifier of the physical host can be retrieved from each virtual container object and matched to the corresponding physical host object. In a typical embodiment, the block 1506 results in the discovery of dependencies similar to the discoverable dependency 1036(2) of FIG. 10.

At block 1508, for each VNFC path object in the NSTM instance, the inter-model dependency generator 142 determines one or more corresponding virtual path objects in the VITM instance. As described previously, a VNFC path represented by a given VNFC path object can be implemented by, and therefore depend on, one or more virtual paths at a virtual infrastructure layer. Therefore, a corresponding virtual path object for a given VNFC path object could be a virtual path object that models such a virtual path. In a typical embodiment, the block 1508 results in the discovery of dependencies similar to the discoverable dependency 1038(1) of FIG. 10.

In an example, the block 1508 could include executing an algorithm similar to the following (steps (1) to (4)):

(1) For each VNFC path object in the NSTM instance, determine two VNFC objects representing two VNFC endpoints (i.e., a VNFC for each end of a VNFC path). For example, if each VNFC path object is an object of the VNFC path object type 982 of FIG. 9, the two VNFC objects can be identified using "From_VNFC" and "To_VNFC" attributes.

(2) For each VNFC object determined at step (1), determine a corresponding virtual container object at the virtual infrastructure layer. In general, the corresponding virtual container objects can be determined as described with respect to block 1504.

(3) For each VNFC object determined at step (1), create a list of virtual network interface objects contained by the corresponding virtual container object. For example, if all virtual container objects are objects of the virtual container object type 864 of FIG. 8, the virtual network interface objects contained by a given virtual container object can include each "vPort" indicated to be contained thereby in the VITM instance. In a typical embodiment, this step results in two lists of virtual network interface objects for each VNFC path object, i.e., one list for each VNFC object determined at step (1). The lists can be, for example, lists of identifiers for the virtual network interface objects.

(4) For each VNFC path object in the NSTM instance, determine, from a traversal of the VITM instance, a virtual path object that includes, or identifies, a virtual network interface object from each of the two lists for that VNFC path object. In a typical embodiment, a given VNFC path object can be considered to depend on the determined virtual path object. For example, if all virtual path objects are objects of the virtual path object type 866 of FIG. 8, the virtual path object on which a VNFC path object depends could identify, in its attributes, one virtual network interface object from each of the two lists (e.g., one as a "vPort_From" and one as a "vPort_To"). For purposes of this example, it is assumed that a VNFC path object only depends on one virtual path object. In some embodiments, a VNFC path object can depend on more than one virtual path object.

At block 1510, for each virtual path object in the VITM instance, the inter-model dependency generator 142 determines one or more corresponding physical path objects in the PITM instance. As described previously, a virtual path represented by a given virtual path object can be physically implemented by, and therefore depend on, one or more physical paths at a physical infrastructure layer. Therefore, a corresponding physical path object for a given virtual path object could be a physical path object that models such a physical path. In a typical embodiment, the block 1510 results in the discovery of dependencies similar to the discoverable dependency 1036(1) of FIG. 10.

In an example, the block 1510 could include executing an algorithm similar to the following (steps (1) to (4)):

(1) For each virtual path object in the VITM instance, determine the two virtual network interface objects that represent virtual endpoints of the modeled virtual path. For example, if all virtual path objects are objects of the virtual path object type 866 of FIG. 8, the two virtual network interface objects of any given virtual path object can be indicated by "vPort_From" and "vPort_To" attributes.

(2) For each virtual network interface object determined at step (1), determine a physical host object that represents a physical host which services the modeled virtual network interface at the physical infrastructure layer. For example, if all virtual network interfaces are modeled as vPort objects of a "vPort" object type as shown in FIG. 8, the physical host that services a virtual network interface can be an attribute of the vPort object which models that virtual network interface. In a typical embodiment, this step results in identification of two physical host objects for each virtual path object, one physical host for each virtual endpoint.

(3) For each virtual path object, determine, from a traversal of the PITM instance, physical network interface object(s) contained by the two physical host objects that were determined at step (2). For example, if all physical hosts are modeled as physical host objects of the physical host object type 661 of FIG. 6, the physical network interface(s) can be physical NICs modeled by objects of a "HostNICPort" object type. According to this example, the physical network interface object(s) contained by a physical host object can be the objects of the "HostNICPort" object type which that physical host objects contains (as indicated in the PITM instance).

(4) For each virtual path object, traverse the PITM instance and identify each physical path object that includes, as physical endpoints, the physical network interfaces modeled by both of the physical network interface objects from step (3). In a typical embodiment, a given virtual path object can be considered to depend on the identified physical path objects. For example, if all physical path objects are objects of the physical path object type 662 of FIG. 6, the physical path object on which a virtual path object depends could identify, in its attributes, both of the physical network interface objects from step (3) (e.g., either as a "Start_Port" attribute or an "End_Port" attribute).

At block 1512, the inter-model dependency generator 142 stores the dependencies determined or discovered at blocks 1502-1510 in the data store 160 or in other memory. In some embodiments, the block 1512 may be omitted.

Figure 16:
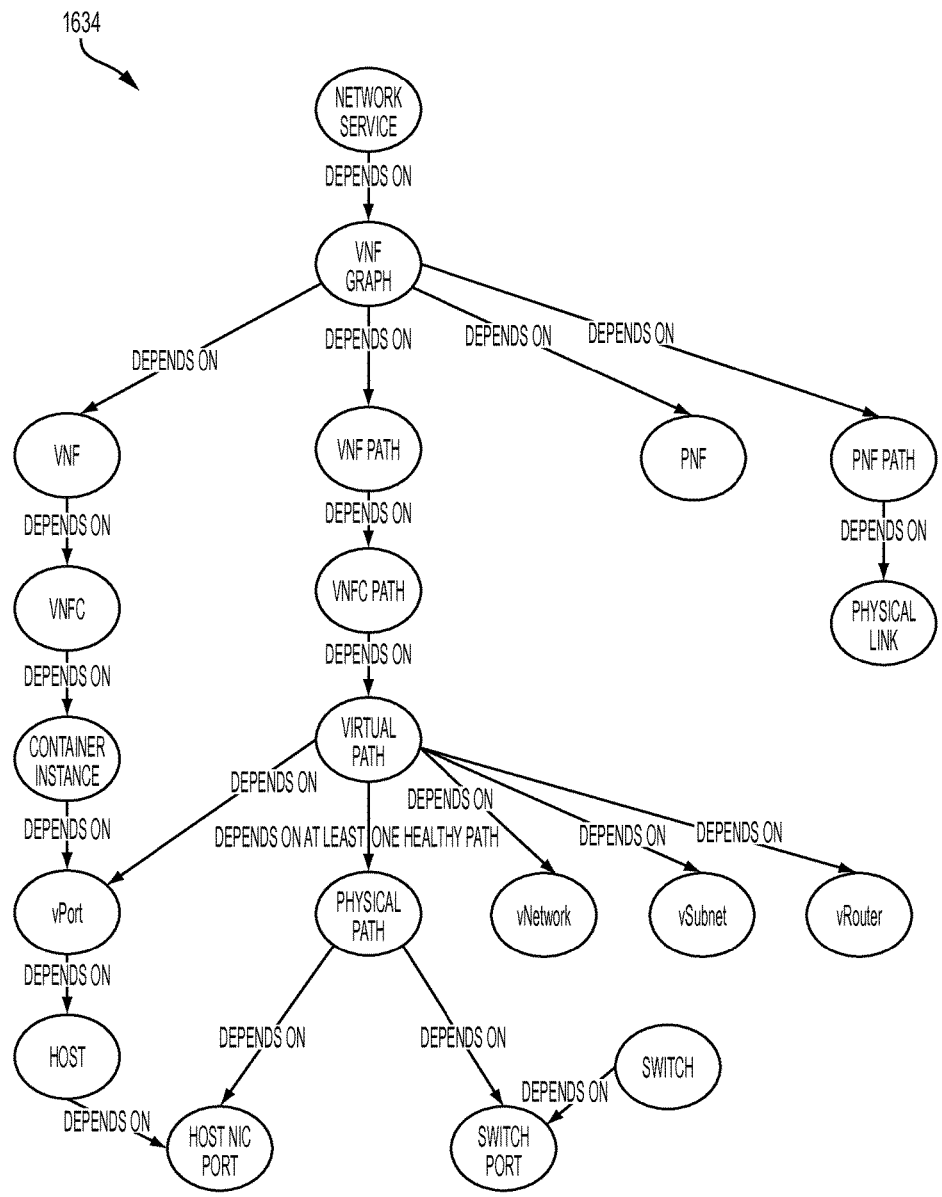
FIG. 16 illustrates an example of a dependency graph.

FIG. 16 illustrates an example of a dependency graph 1634. In a typical embodiment, the dependency graph 1634 can be generated and output as described with respect to the process 1400 of FIG. 14.

Figure 17:
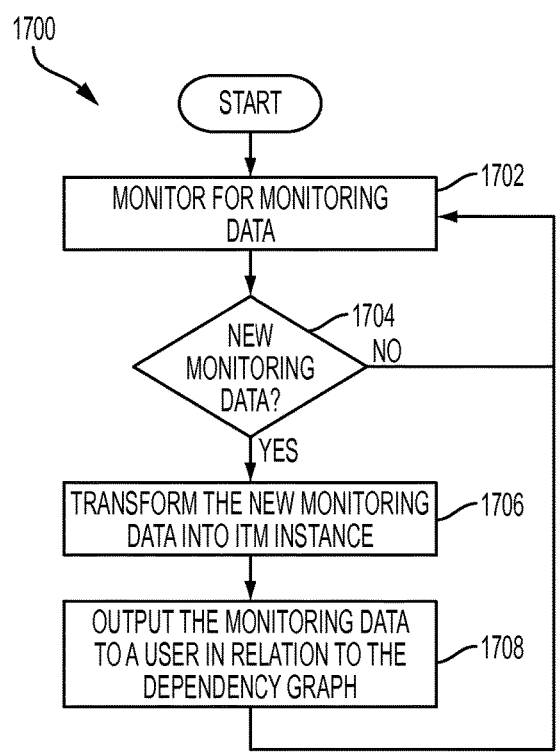
FIG. 17 illustrates an example of a process for monitoring resources of a multilayer architecture in relation to a dependency graph.

FIG. 17 illustrates an example of a process 1700 for monitoring resources of a multilayer NFV-based architecture in relation to a dependency graph. In certain embodiments, the process 1700 can be performed in response to a dependency graph being generated and output as described with respect to the process 1400 of FIG. 14. The process 1700 can be implemented by any system that can process data. For example, the process 1700, in whole or in part, can be implemented by one or more of the monitoring system 122, the computing management system 110 and/or the data store 160 of FIG. 1. In some cases, the process 1700 can be performed generally by the computing environment 100. Although any number of systems, in whole or in part, can implement the process 1700, to simplify discussion, the process 1700 will be described in relation to particular components or systems of the computing environment 100 of FIG. 1.

At block 1702, the monitoring system 122 monitors for new monitoring data related to monitored resources of an NFV-based architecture. In a typical embodiment, the monitoring system 122 can operate as described in relation to the monitoring system 422 of FIG. 4. In addition, in general, an ITM instance and a dependency graph have already been created or generated as described in relation to FIG. 14.

At decision block 1704, the monitoring system 122 determines whether new monitoring data has been detected. In various cases, new monitoring data can result from any layer of an NFV architecture such as, for example, the multilayered architecture 300 of FIG. 3. Consequently, new monitoring data may be detected from any monitoring subsystem of the monitoring system 122. For example, new monitoring data can be detected by a network service monitoring subsystem, a virtual infrastructure monitoring subsystem and/or a physical infrastructure monitoring subsystem as described in relation to FIG. 4. If it is determined at the decision block 1704 that no new monitoring data has been detected, the process 1700 returns to block 1702 and proceeds as described above. Otherwise, if it is determined at the decision block 1704 that new monitoring data has been detected, the process 1700 proceeds to block 1706.

At block 1706, the topology engine 130 transforms the new monitoring data into the ITM instance for the NFV-based architecture. At block 1708, the dashboard user interface 150 outputs the new monitoring data in relation to the dependency graph for the NFV-based architecture. For example, the dashboard user interface 150 can output a dependency graph similar to the dependency graph 434 of FIG. 4. From block 1708, the process 1700 returns to block 1702 and proceeds as described above. In general, the process 1700 can continue until terminated by a user or administrator or until other suitable stop criteria is satisfied.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Some or all of the features described herein are sufficiently mathematically or technically complex that one or more computing devices may be necessary to carry them out. Thus, for example, the various illustrative logical blocks, modules and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method comprising, by a computer system:
    responsive to deployment of at least one component of a virtual network function (VNF) in a multilayer network function virtualization (NFV) architecture, creating an integrated topology model (ITM) instance of interconnected topology objects, the ITM instance comprising:
        a physical infrastructure topology model (PITM) instance comprising first interconnected topology objects, the first interconnected topology objects representing a plurality of monitored physical resources residing at a physical infrastructure layer of the multilayer NFV architecture, wherein interconnections between the first interconnected topology objects reflect relationships between the plurality of monitored physical resources;
        a virtual infrastructure topology model (VITM) instance comprising second interconnected topology objects, the second interconnected topology objects representing a plurality of monitored virtual resources residing at a virtual infrastructure layer of the multilayer NFV architecture, wherein the plurality of monitored virtual resources are physically implemented at the physical infrastructure layer, wherein interconnections between the second interconnected topology objects reflect relationships between the plurality of monitored virtual resources;
        a network service topology model (NSTM) instance comprising third interconnected topology objects, the third interconnected topology objects representing a plurality of monitored virtual network resources residing at a network service layer of the multilayer NFV architecture, wherein the monitored virtual network resources are virtually realized at the virtual infrastructure layer, wherein interconnections between the third interconnected topology objects reflect relationships between the plurality of monitored virtual network resources; and
        inter-model linking information usable to relate at least some of the third interconnected topology objects to at least some of the second interconnected topology objects;
    generating dependencies between the interconnected topology objects of the ITM instance based, at least in part, on the inter-model linking information, wherein the dependencies comprise:
        a dependency of at least one of the third interconnected topology objects on at least one of the second topology objects; and
        a dependency of at least one of the second interconnected topology objects on at least one of the first interconnected topology objects
    generating a dependency graph for the multilayer NFV architecture based, at least in part, on the dependencies; and
    outputting at least a portion of the dependency graph for presentation to a user.

2. The method of claim 1, wherein:
    the first interconnected topology objects of the PITM instance comprise:
        a plurality of physical host objects that model physical hosts residing at the physical infrastructure layer; and
        a plurality of physical path objects that each model a physical path between at least two physical hosts;
    the second interconnected topology objects of the VITM instance comprise:
        a plurality of virtual container objects that model virtual containers residing at the virtual infrastructure layer;
        a plurality of virtual path objects that each model a virtual path between at least two virtual containers;
    the third interconnected topology objects of the NSTM instance comprise:
        a plurality of VNF objects that model VNFs residing at the network service layer;
        a plurality of VNF path objects that each model a path between at least two VNFs;
        a plurality of VNF component (VNFC) objects that model VNFCs residing at the network service layer; and a plurality of VNFC path objects that each model a path between at least two VNFCs.

3. The method of claim 2, wherein the generating dependencies comprises:
determining internal dependencies within each of the PITM instance, the VITM instance and the NSTM instance;
determining, for each VNFC object in the NSTM instance, a corresponding virtual container object in the VITM instance, wherein the dependencies comprise a dependency of the VNFC object on the corresponding virtual container object;
determining, for each virtual container object in the VITM instance, a corresponding physical host object in the PITM instance, wherein the dependencies comprise a dependency of the virtual container object on the corresponding physical host object;
determining, for each VNFC path object in the NSTM instance, a corresponding virtual path object in the VITM instance, wherein the dependencies comprise a dependency of the VNFC path object on the corresponding virtual path object; and
determining, for each virtual path object in the VITM instance, a corresponding physical path object in the PITM instance, wherein the dependencies comprise a dependency of the virtual path object on the corresponding physical path object.

4. The method of claim 3, wherein the determining, for each VNFC object in the NSTM instance, a corresponding virtual container object in the VITM instance, comprises:
traversing the NSTM instance; and
for each VNFC object in the NSTM instance, looking up an identifier of the VNFC object in a linking object, wherein the linking object comprises a plurality of entries, each entry linking a VNFC object identifier to a virtual container object identifier.

5. The method of claim 3, wherein the determining, for each VNFC object in the NSTM instance, a corresponding virtual container object in the VITM instance, comprises:
traversing the NSTM instance; and
determining a virtual container object identifier stored within each VNFC object.

6. The method of claim 3, wherein the determining, for each virtual container object in the VITM instance, a corresponding physical host object in the PITM instance, comprises:
determining two VNFC endpoints for each VNFC path object in the NSTM instance;
for each determined VNFC endpoint, determining a corresponding virtual container object in the VITM instance;
for each determined VNFC endpoint, creating a list of virtual network interfaces of the corresponding virtual container object, wherein the creating results in two lists for each VNFC path object in the NSTM instance; and
for each VNFC path object in the NSTM instance, determining, based at least in part on a traversal of the VITM instance, a virtual path object in the VITM instance that includes a virtual network interface from each of the two lists for the VNFC path object.

7. The method of claim 3, wherein the determining, for each virtual path object in the VITM instance, a corresponding physical path object in the PITM instance, comprises:
for each virtual path object in the VITM instance, determining two virtual network interfaces that serve as virtual endpoints of a virtual path modeled thereby;
for each determined virtual network interface, determining a physical host object in the PITM instance which models a physical host that services the determined virtual network interface, wherein the determining results in a first physical host object and a second physical host object being determined for each virtual path object in the VITM instance;
for each virtual path object in the VITM instance, determining, based at least in part on a traversal of the PITM instance, a physical network interface object contained by the first physical host object and a physical network interface contained by the second physical host object; and
for each virtual path object in the VITM instance, identifying, based at least in part on a traversal of the PITM instance, a physical path object that identifies both the physical network interface object contained by the first physical host object and the physical network interface object contained by the second physical host object.

8. The method of claim 1, wherein the creating an ITM instance comprises creating, as at least part of the inter-model linking information, a linking object that links each VNFC object of the NSTM instance to a virtual container object of the VITM instance.

9. The method of claim 1, comprising:
receiving monitoring data related to the plurality of monitored resources;
transforming the monitoring data in real-time into the ITM instance; and
presenting the transformed monitoring data to the user in relation to the dependency graph.

10. The method of claim 9, wherein the transforming comprises propagating a detected event at one layer of the multilayer NFV architecture to at least one other layer of the multilayer NFV architecture based, at least in part, on the dependency graph.

11. The method of claim 9, wherein the transforming comprises propagating a detected event at the physical infrastructure layer to the virtual infrastructure layer and to the physical infrastructure layer based, at least in part, on the dependency graph.

12. An information handling system comprising a processor, wherein the processor is operable to implement a method comprising:
responsive to deployment of at least one component of a virtual network function (VNF) in a multilayer network function virtualization (NFV) architecture, creating an integrated topology model (ITM) instance of interconnected topology objects, the ITM instance comprising:
a physical infrastructure topology model (PITM) instance comprising first interconnected topology objects, the first interconnected topology objects representing a plurality of monitored physical resources residing at a physical infrastructure layer of the multilayer NFV architecture, wherein interconnections between the first interconnected topology objects reflect relationships between the plurality of monitored physical resources;
a virtual infrastructure topology model (VITM) instance comprising second interconnected topology objects, the second interconnected topology objects representing a plurality of monitored virtual resources residing at a virtual infrastructure layer of the multilayer NFV architecture, wherein the plurality of monitored virtual resources are physically implemented at the physical infrastructure layer, wherein interconnections between the second interconnected topology objects reflect relationships between the plurality of monitored virtual resources;

a network service topology model (NSTM) instance comprising third interconnected topology objects, the third interconnected topology objects representing a plurality of monitored virtual network resources residing at a network service layer of the multilayer NFV architecture, wherein the monitored virtual network resources are virtually realized at the virtual infrastructure layer, wherein interconnections between the third interconnected topology objects reflect relationships between the plurality of monitored virtual network resources; and inter-model linking information usable to relate at least some of the third interconnected topology objects to at least some of the second interconnected topology objects;

generating dependencies between the interconnected topology objects of the ITM instance based, at least in part, on the inter-model linking information, wherein the dependencies comprise:

a dependency of at least one of the third interconnected topology objects on at least one of the second topology objects; and a dependency of at least one of the second interconnected topology objects on at least one of the first interconnected topology objects generating a dependency graph for the multilayer NFV architecture based, at least in part, on the dependencies; and outputting at least a portion of the dependency graph for presentation to a user.

13. The information handling system of claim 12, wherein:

the first interconnected topology objects of the PITM instance comprise:

a plurality of physical host objects that model physical hosts residing at the physical infrastructure layer; and a plurality of physical path objects that each model a physical path between at least two physical hosts;

the second interconnected topology objects of the VITM instance comprise:

a plurality of virtual container objects that model virtual containers residing at the virtual infrastructure layer;

a plurality of virtual path objects that each model a virtual path between at least two virtual containers;

the third interconnected topology objects of the NSTM instance comprise:

a plurality of VNF objects that model VNFs residing at the network service layer;

a plurality of VNF path objects that each model a path between at least two VNFs;

a plurality of VNF component (VNFC) objects that model VNFCs residing at the network service layer; and a plurality of VNFC path objects that each model a path between at least two VNFCs.

14. The information handling system of claim 13, wherein the generating dependencies comprises:

determining internal dependencies within each of the PITM instance, the VITM instance and the NSTM instance;

determining, for each VNFC object in the NSTM instance, a corresponding virtual container object in the VITM instance, wherein the dependencies comprise a dependency of the VNFC object on the corresponding virtual container object;

determining, for each virtual container object in the VITM instance, a corresponding physical host object in the PITM instance, wherein the dependencies comprise a dependency of the virtual container object on the corresponding physical host object;

determining, for each VNFC path object in the NSTM instance, a corresponding virtual path object in the VITM instance, wherein the dependencies comprise a dependency of the VNFC path object on the corresponding virtual path object; and determining, for each virtual path object in the VITM instance, a corresponding physical path object in the PITM instance, wherein the dependencies comprise a dependency of the virtual path object on the corresponding physical path object.

15. The information handling system of claim 14, wherein the determining, for each VNFC object in the NSTM instance, a corresponding virtual container object in the VITM instance, comprises:

traversing the NSTM instance; and for each VNFC object in the NSTM instance, looking up an identifier of the VNFC object in a linking object, wherein the linking object comprises a plurality of entries, each entry linking a VNFC object identifier to a virtual container object identifier.

16. The information handling system of claim 14, wherein the determining, for each VNFC object in the NSTM instance, a corresponding virtual container object in the VITM instance, comprises:

traversing the NSTM instance; and determining a virtual container object identifier stored within each VNFC object.

17. The information handling system of claim 14, wherein the determining, for each virtual container object in the VITM instance, a corresponding physical host object in the PITM instance, comprises:

determining two VNFC endpoints for each VNFC path object in the NSTM instance;

for each determined VNFC endpoint, determining a corresponding virtual container object in the VITM instance;

for each determined VNFC endpoint, creating a list of virtual network interfaces of the corresponding virtual container object, wherein the creating results in two lists for each VNFC path object in the NSTM instance; and for each VNFC path object in the NSTM instance, determining, based at least in part on a traversal of the VITM instance, a virtual path object in the VITM instance that includes a virtual network interface from each of the two lists for the VNFC path object.

18. The information handling system of claim 14, wherein the determining, for each virtual path object in the VITM instance, a corresponding physical path object in the PITM instance, comprises:

for each virtual path object in the VITM instance, determining two virtual network interfaces that serve as virtual endpoints of a virtual path modeled thereby;

for each determined virtual network interface, determining a physical host object in the PITM instance which models a physical host that services the determined virtual network interface, wherein the determining results in a first physical host object and a second physical host object being determined for each virtual path object in the VITM instance;

for each virtual path object in the VITM instance, determining, based at least in part on a traversal of the PITM instance, a physical network interface object contained by the first physical host object and a physical network interface contained by the second physical host object; and for each virtual path object in the VITM instance, identifying, based at least in part on a traversal of the PITM instance, a physical path object that identifies both the physical network interface object contained by the first physical host object and the physical network interface object contained by the second physical host object.

19. The information handling system of claim 12, wherein the creating an ITM instance comprises creating, as at least part of the inter-model linking information, a linking object that links each VNFC object of the NSTM instance to a virtual container object of the VITM instance.

20. A computer-program product comprising a non-transitory computer-usable medium having computer-readable program code embodied therein, the computer-readable program code adapted to be executed to implement a method comprising:

responsive to deployment of at least one component of a virtual network function (VNF) in a multilayer network function virtualization (NFV) architecture, creating an integrated topology model (ITM) instance of interconnected topology objects, the ITM instance comprising:

a physical infrastructure topology model (PITM) instance comprising first interconnected topology objects, the first interconnected topology objects representing a plurality of monitored physical resources residing at a physical infrastructure layer of the multilayer NFV architecture, wherein interconnections between the first interconnected topology objects reflect relationships between the plurality of monitored physical resources;

a virtual infrastructure topology model (VITM) instance comprising second interconnected topology objects, the second interconnected topology objects representing a plurality of monitored virtual resources residing at a virtual infrastructure layer of the multilayer NFV architecture, wherein the plurality of monitored virtual resources are physically implemented at the physical infrastructure layer, wherein interconnections between the second interconnected topology objects reflect relationships between the plurality of monitored virtual resources;

a network service topology model (NSTM) instance comprising third interconnected topology objects, the third interconnected topology objects representing a plurality of monitored virtual network resources residing at a network service layer of the multilayer NFV architecture, wherein the monitored virtual network resources are virtually realized at the virtual infrastructure layer, wherein interconnections between the third interconnected topology objects reflect relationships between the plurality of monitored virtual network resources; and inter-model linking information usable to relate at least some of the third interconnected topology objects to at least some of the second interconnected topology objects;

generating dependencies between the interconnected topology objects of the ITM instance based, at least in part, on the inter-model linking information, wherein the dependencies comprise:

a dependency of at least one of the third interconnected topology objects on at least one of the second topology objects; and a dependency of at least one of the second interconnected topology objects on at least one of the first interconnected topology objects generating a dependency graph for the multilayer NFV architecture based, at least in part, on the dependencies; and outputting at least a portion of the dependency graph for presentation to a user.

* * * * *